US008182125B2

(12) United States Patent
Englander et al.

(10) Patent No.: US 8,182,125 B2
(45) Date of Patent: *May 22, 2012

(54) EXTERNAL SAFETY ILLUMINATION FOR A BUS WITH LIGHT MOUNTED TO MIRROR ARM

(75) Inventors: Benjamin Englander, Woodmere, NY (US); Julian Serer, Plainview, NY (US); David Mcdonald, Jamaica, NY (US)

(73) Assignee: Rosco Inc., Jamaica, NY (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/465,162

(22) Filed: May 13, 2009

(65) Prior Publication Data
US 2009/0273941 A1 Nov. 5, 2009

Related U.S. Application Data

(63) Continuation-in-part of application No. 11/936,522, filed on Nov. 7, 2007.

(60) Provisional application No. 61/119,264, filed on Dec. 2, 2008, provisional application No. 60/913,580, filed on Apr. 24, 2007, provisional application No. 60/857,250, filed on Nov. 7, 2006.

(51) Int. Cl.
*B60Q 1/26* (2006.01)
*B60R 1/12* (2006.01)
(52) U.S. Cl. .................................. 362/494; 362/478
(58) Field of Classification Search .............. 362/253, 362/478, 485, 494, 545
See application file for complete search history.

(56) References Cited

U.S. PATENT DOCUMENTS

| 4,436,372 A | 3/1984 | Schmidt et al. |
| 4,822,157 A | 4/1989 | Stout |
| 4,938,578 A | 7/1990 | Schmidt et al. |
| 5,084,785 A | 1/1992 | Albers et al. |
| 5,281,948 A | 1/1994 | Estrada |
| 5,455,625 A | 10/1995 | Englander |
| 5,467,071 A | 11/1995 | Koenig |
| 5,493,269 A * | 2/1996 | Durley et al. ............. 340/433 |
| 5,525,430 A | 6/1996 | Chahroudi |
| 5,576,899 A | 11/1996 | Englander |
| 5,708,522 A | 1/1998 | Levy |
| 5,874,989 A | 2/1999 | O'Brien et al. |
| 6,328,450 B2 | 12/2001 | Englander |
| 6,371,618 B1 | 4/2002 | Englander et al. |
| 6,700,692 B2 | 3/2004 | Tonar et al. |
| 6,796,667 B1 | 9/2004 | Englander |

(Continued)

FOREIGN PATENT DOCUMENTS
JP   10-059077 A  *  3/1998

*Primary Examiner* — Jason Moon Han
(74) *Attorney, Agent, or Firm* — Stroock & Stroock & Lavan LLP

(57) ABSTRACT

A light source along the mirror mounting arm of a school bus or other passenger vehicle to reduce the risk of people or other objects being injured by the school bus. The light source may be mounted directly on the mirror mounting arm or embedded within a mirror mount. The light source may be focused downward to illuminate the ground and may provide vehicle status information and guiding information. Additionally the light source may sweep the ground back and forth or be directed under the control of the driver. The light source may be activated automatically when movement is detected near the vehicle.

21 Claims, 16 Drawing Sheets

U.S. PATENT DOCUMENTS

| | | |
|---|---|---|
| 6,848,816 B2 * | 2/2005 | Gilbert et al. ............... 362/494 |
| 6,871,981 B2 | 3/2005 | Alexanderson et al. |
| 6,883,923 B2 | 4/2005 | Englander |
| 7,055,973 B2 | 6/2006 | Englander |
| 7,427,150 B2 * | 9/2008 | Carter et al. ............... 362/494 |
| 2005/0179527 A1 | 8/2005 | Schofield |
| 2005/0180032 A1 | 8/2005 | Seguchi et al. |
| 2008/0094684 A1 * | 4/2008 | Varaprasad et al. ......... 359/267 |
| 2008/0106908 A1 | 5/2008 | Englander |
| 2009/0009874 A1 | 1/2009 | Englander |

* cited by examiner

US 8,182,125 B2

EXTERNAL SAFETY ILLUMINATION FOR A BUS WITH LIGHT MOUNTED TO MIRROR ARM

CROSS REFERENCE TO RELATED APPLICATIONS

The present application claims priority to U.S. Provisional Pat. App. No. 61/119,264, filed on Dec. 2, 2008 entitled EXTERNAL SAFETY ILLUMINATION FOR A BUS WITH LIGHT MOUNTED TO BRACKET. The present application is also a continuation-in-part of U.S. non-provisional patent application Ser. No. 11/936,522, filed on Nov. 7, 2007 entitled EXTERNAL SAFETY ILLUMINATION FOR A BUS, which claims priority to U.S. Provisional Application Ser. No. 60/913,580 filed Apr. 24, 2007 entitled EXTERNAL SAFETY ILLUMINATION FOR A BUS, and to U.S. Provisional Patent Application Ser. No. 60/857,250 filed Nov. 7, 2006 entitled MULTIPLE CAMERA SYSTEM FOR PROVIDING 360 DEGREE COVERAGE FOR SCHOOL BUSES, the entire contents of which applications are hereby incorporated by reference herein.

FIELD OF THE INVENTION

The present application generally relates to vehicle exterior illumination, and more particularly, to an illumination apparatus, system and method for illumination of the exterior of a large vehicle, truck and/or bus, such as a school bus, for the safety of passengers exiting or boarding the bus or in the general vicinity of the vehicle.

BACKGROUND OF THE INVENTION

Passengers exiting and boarding or in the vicinity of a large vehicle, such as a truck, bus and/or school bus present the operator of the vehicle, such as the school bus driver, with the problem that the vehicle cannot be safely moved until the people in the vicinity and/or passengers have cleared the area around the vehicle. Mirrors mounted at various portions of the interior and exterior of the vehicle are often used to help the vehicle operator in determining when it is safe to recommence movement of the vehicle.

School buses pose a particular challenge because they carry children and society has set higher standards for protecting these children, as they board and disembark from school buses. Children are typically shorter than adults and therefore their visibility around and behind the school bus is more challenging for the school bus driver. Also, children may not be aware of the urgency of the need to clear the area around the school bus.

School buses have government mandated requirements for mirror systems to aid the driver in monitoring the students/children as they embark and disembark from the school buses. A great body of prior art has been developed for such mirror systems, including so-called cross-view or cross-over mirrors, which provide a panoramic view to the driver, showing the children as they move about in front and alongside the school bus. Federal regulations that relate to cross-view mirrors are known as the FMVSS 111 regulations, incorporated herein by reference.

More recently, camera systems have been used in the interiors of school buses. As an example, the present assignee describes an interior camera and a protective closure, in its U.S. Pat. No. 5,455,625, incorporated herein by reference.

However, poor visibility conditions, such as when it is dark or near dark outside or during misty or foggy conditions, present a problem for the school bus driver, even with the best mirror system and with the optimal camera system. Therefore, the need to provide for good visibility and illumination of the area around, behind and/or under the school bus remains.

SUMMARY OF THE DISCLOSURE

Examples of the invention will be provided with respect to a school bus. However, it will be understood that the illumination system provided has application for other types of buses and vehicles, particularly larger vehicles with passengers.

According to an aspect of the present disclosure, strip lighting is provided along a side, or along both sides of the school bus to illuminate an area near the school bus. For example, an LED (light emitting diode) lighting system that emits white light may be provided, as a lighting strip along the side of the school bus between a door near the front of the school bus and the back side of the school bus, and to the front as well. The lighting strip may be slightly tilted down or otherwise aimed or focused down to illuminate the ground near the school bus. Lighting strips may be provided on both sides of the school bus, and may also be provided on the back side of the school bus. Further, the lighting strip may be provided on the bottom, i.e., underside, of the school bus along the side to illuminate the bottom of the school bus and the area along the side of the school bus. Such a configuration is particularly suitable for a school bus for which the risk of a small child falling under the school bus is a hazard to be avoided. Moreover, less light will be reflected into the driver's eyes, causing less interference with the driver's night or low light vision.

According to another aspect of the instant disclosure, one or more down pointing floodlights may be provided on the roof or near the top of the school bus along the side with the passenger door to illuminate the area near the school bus. Alternatively, a single strobe light may sweep the area or may be controlled by the school bus operator to be directed to a particular area.

A control mode in which the illuminating lights are triggered by an opening of the school bus door or by the flashing light provided on the exterior rear of the school bus is also provided. A timer may then be used to turn off the light after a set or adjustable period of time following the closing of the door or contemporaneous with the cessation of the flashing light.

The lights may be configured to display letters advising that the vehicle is approaching or departing, or that it is safe or unsafe for passengers to enter the area or lane adjacent the vehicle.

An expandable crossing gate on the driver's side of the exterior wall is also provided.

Also contemplated is a vehicle mirror attachable to the vehicle including a mirror lens that has at least one clear portion for allowing light to pass from behind the mirror lens to an outside of the vehicle mirror and a mirror face with a light reflective portion for reflecting light from the outside, and a light member positioned behind the mirror lens positioned to emit light through the at least one clear portion.

Such a light member may be oriented so as to illuminate an area at the vehicle below or to a side of the mirror. In this way, the clear portion may be a transparent portion, a one-way mirror being reflective to light from the outside, or a groove in the mirror face to allow the light emitted from the light member to pass to the outside.

The light member may be oriented to direct light primarily downward of the mirror face and/or to a side thereof.

The light member may include an LED, an incandescent bulb, a halogen or neon lamp, and may be made of several light sources including one or more of the foregoing.

According to another aspect of the instant disclosure, one or more down pointing light sources may be provided on the mirror mounting arms near the front and rear of the school bus to illuminate the area near the school bus. The downward pointing light source means less light will be reflected into the driver's eyes, causing less interference with the driver's night or low light vision. The downward pointing light source(s) may be fixed, may sweep the area, or may be controlled by the school bus operator to be directed to a particular area.

The downward pointing light sources may be manually turned on and off or may have a control mode in which the lights are triggered by an opening of the school bus door or a motion detector. A timer may then be used to turn off the light after a set or adjustable period of time following the closing of the door or contemporaneous with the cessation of the flashing light.

The downward pointing light source may be mounted directly mirror mounting arm or embedded within a mirror mount on the mounting arm.

Other features and advantages of the present disclosure will become apparent from the following description of the disclosure that refers to the accompanying drawings.

With reference to the drawings, the features thereof are described below.

DETAILED DESCRIPTION OF EMBODIMENTS OF THE INVENTION

Figure 1:
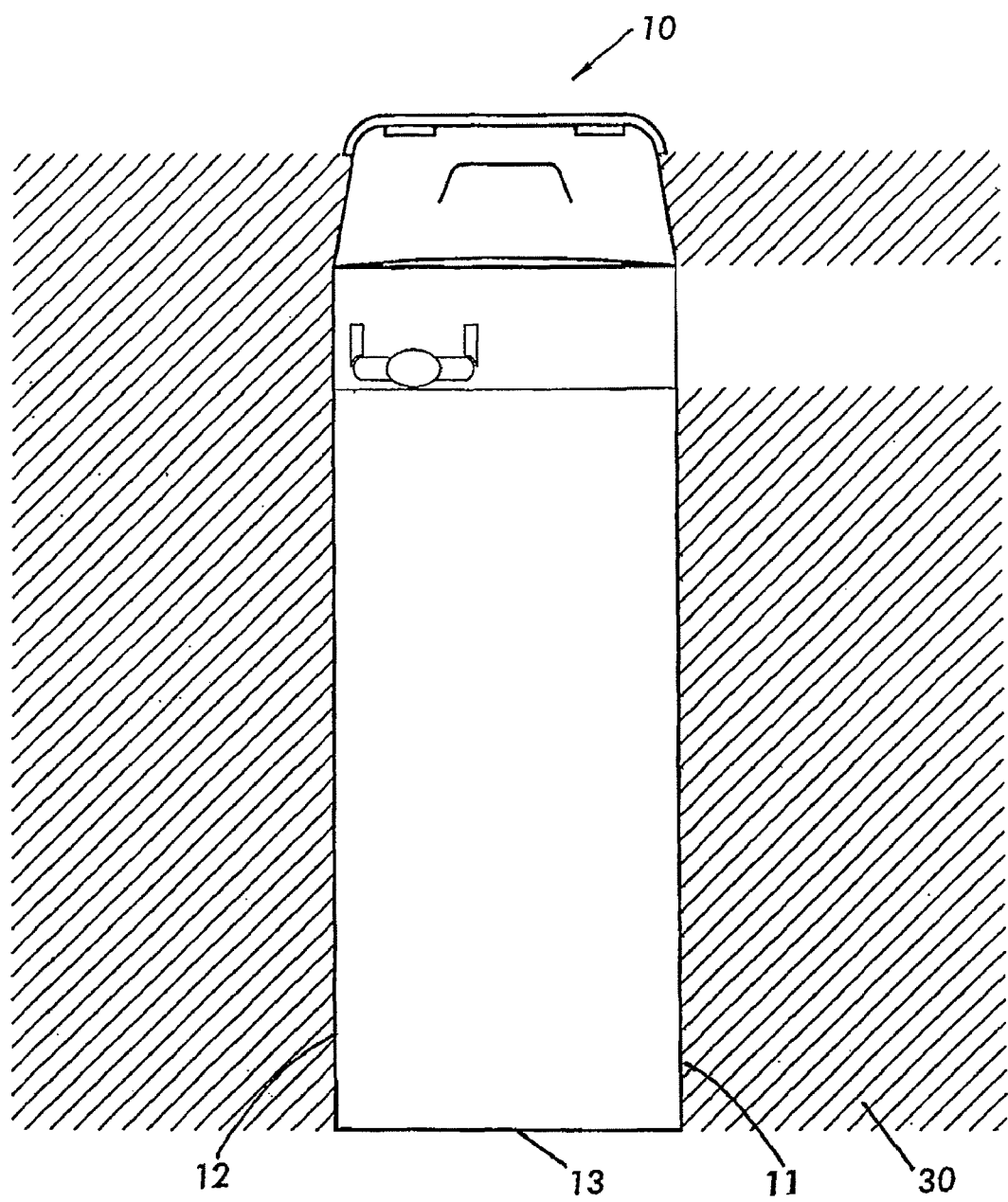
FIG. 1 is a schematic diagram illustrating a top view of a school bus with illuminated areas provided by lighting strips mounted on both sides of the school bus, according to an embodiment of the present invention.

FIG. 1 shows a large vehicle, such as school bus 10 with illuminated areas 30 provided by, for example, lighting strips 20 mounted on both sides of the school bus 10, according to an embodiment of the present invention. Such illumination may be quite helpful to a vehicle operator, such as the school bus driver in preventing accidents involving passengers boarding or exiting from the vehicle. For example, during times of poor visibility when it is dark outside, such as at night, twilight, late winter afternoons, etc., children who are waiting to board the school bus 10 may linger or fall near the school bus 10 and accidentally end up near or underneath the school bus 10, as it starts moving. The illumination shown in FIG. 1 aids the school bus driver in spotting children or fallen objects underneath or near the school bus 10.

Figure 2:
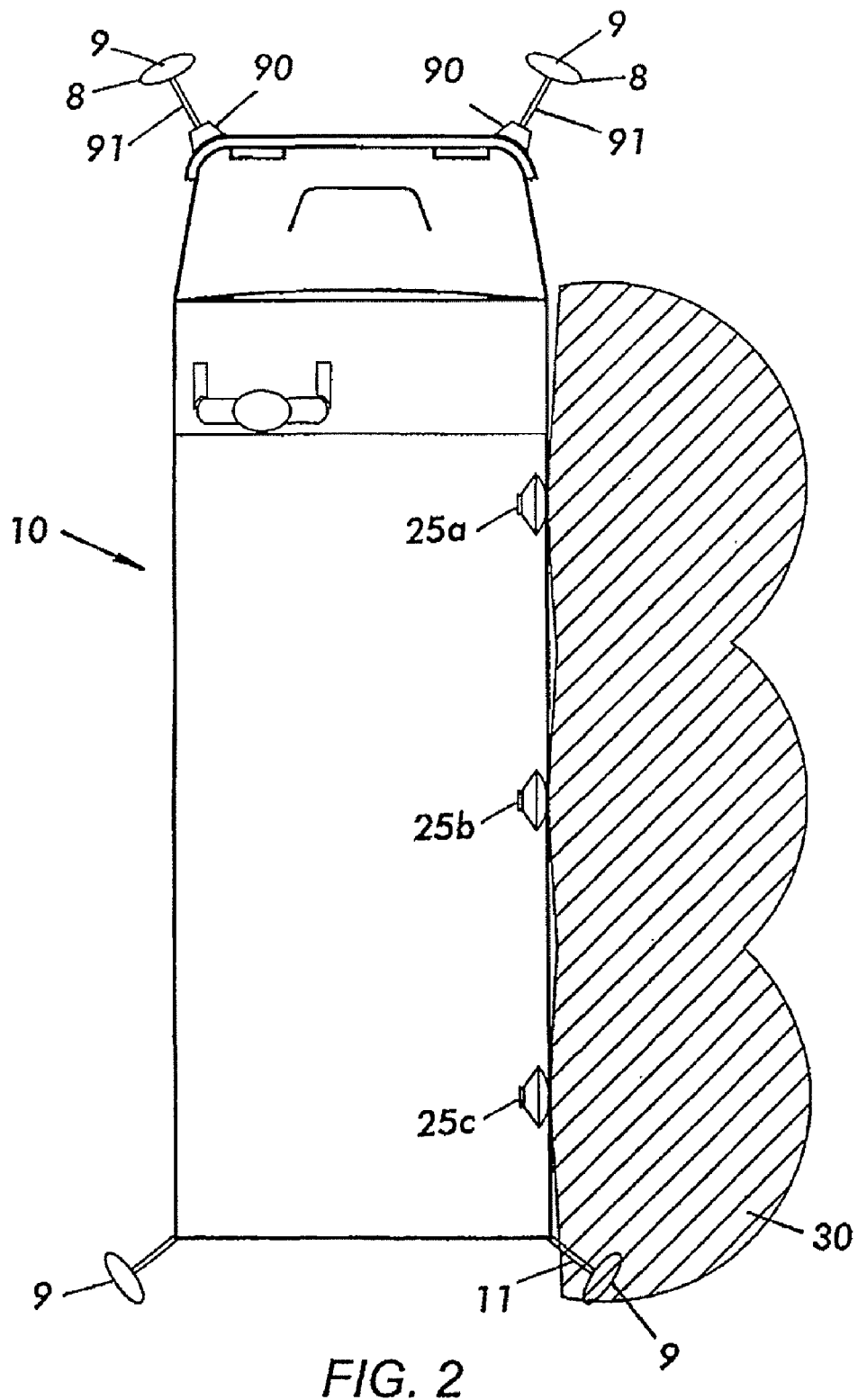
FIG. 2 is a schematic diagram illustrating a top view of a school bus with floodlights mounted on or near the top of the school bus along one side, according to an embodiment of the present invention.

FIG. 2 shows an embodiment in which floodlights 25a, 25b and 25c are provided at or near the top of the school bus 10. The floodlights 25a-25c are focused down to illuminate the pavement or the space just above the pavement along the side 11 of the school bus 10. Although three floodlights are shown in FIG. 2, it will be understood that fewer or more floodlights may be provided as necessary to illuminate the area. The floodlights may be provided as halogen lamps, strobe lights, incandescent bulbs, neon lights, LEDs, other type of lighting sufficient to provide the illumination necessary, preferably without blinding the driver of the vehicle 10 or of adjacent vehicles.

According to an aspect of applicant's invention, the floodlights 25a-25c may be mounted on the arms located at the four corners of the bus, on which cameras 9 are mounted. These cameras 9 are used by the school bus driver to observe the area surrounding the school bus 10, including the illuminated areas 30, to prevent accidents as shown in provisional patent application Ser. No. 60/857,250, the contents of which are incorporated by reference herein. The cameras may be mounted on the same arms 91 as the mirror 8 or on different arms. Motion detectors may be mounted on or adjacent the cameras 9, and these cameras may provide a signal to a display inside the bus, which signals are recorded when the school bus takes on or discharges students.

According to an aspect of this embodiment, one or more of the floodlights may automatically sweep the area on a frequent basis, or may be directed at the discretion of the school bus driver. Alternatively, one of the floodlights, such as the center floodlight 25b, may sweep the area back and forth or may be controlled and directed by the school bus driver with the other floodlights 25a and 25c remaining fixedly focused. It will be understood that, as with the lighting strips 20, the floodlights 25a-25c may be provided also on the other side 12 of the school bus 10 and may be controlled to turn on and off in a manner similar to the lighting strip embodiment. Further, a combination of floodlights and lighting strips 20-22 may be used on the same school bus 10 mounted at different places on the school bus 10. Thus, for example, floodlight 25b may be provided as a source of illumination steerable or directable by the school bus driver with lighting strips 20-22 provided along the side or on the bottom of the school bus 10. While the lighting strips 20-22 may be comprised of LED light sources, other types of lights may also be used in addition to or instead of LEDs, such as halogen lamps, incandescent bulbs, strobe lighting, neon lights or other types of illumination sufficient to accomplish the aims of the invention.

Figure 8A:
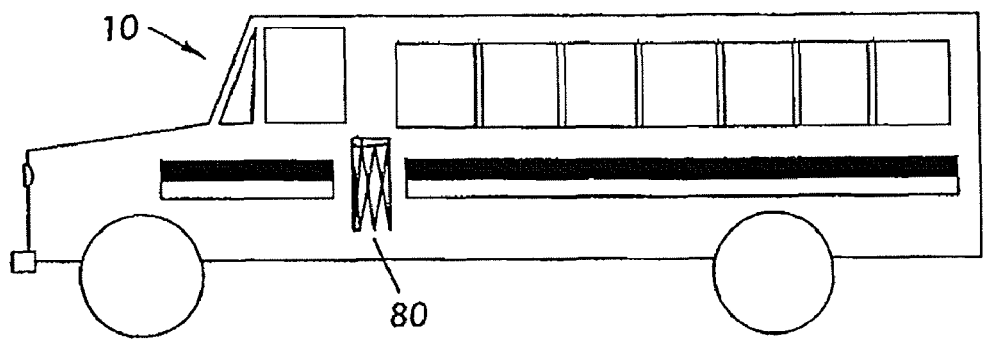
FIGS. 8A-8D illustrate a telescoping crossing gate attached to a side of the school bus according to an aspect of the present disclosure.
Figure 8B:
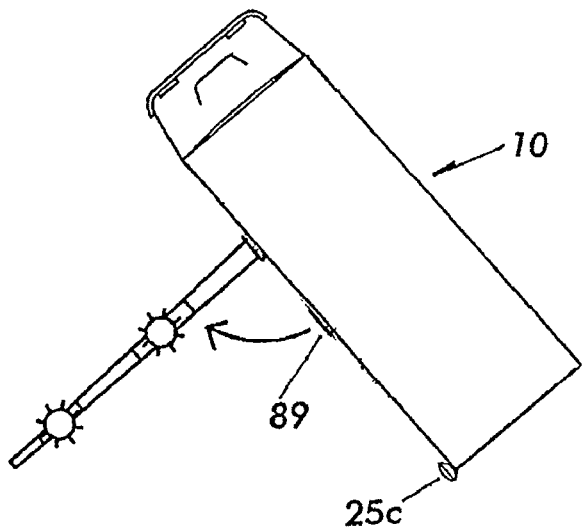
Figure 8C:
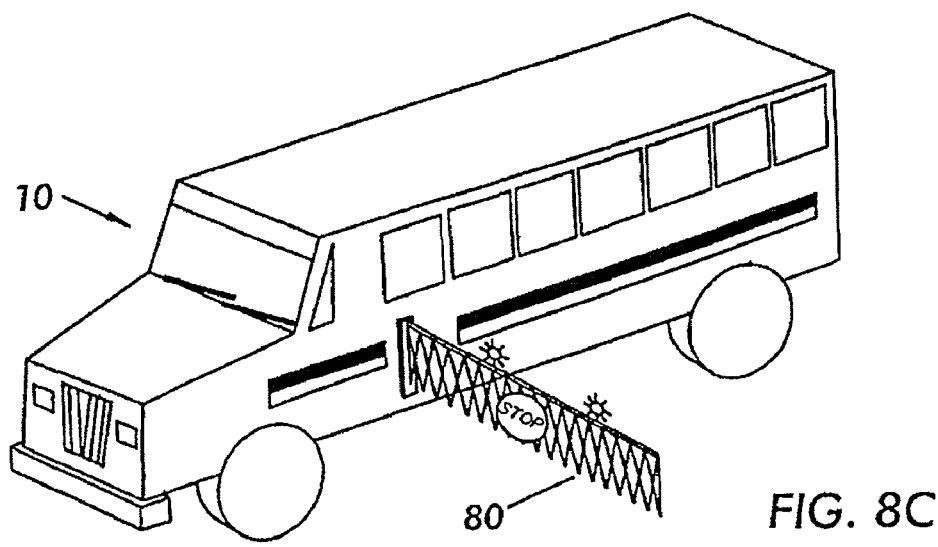
Figure 9A:
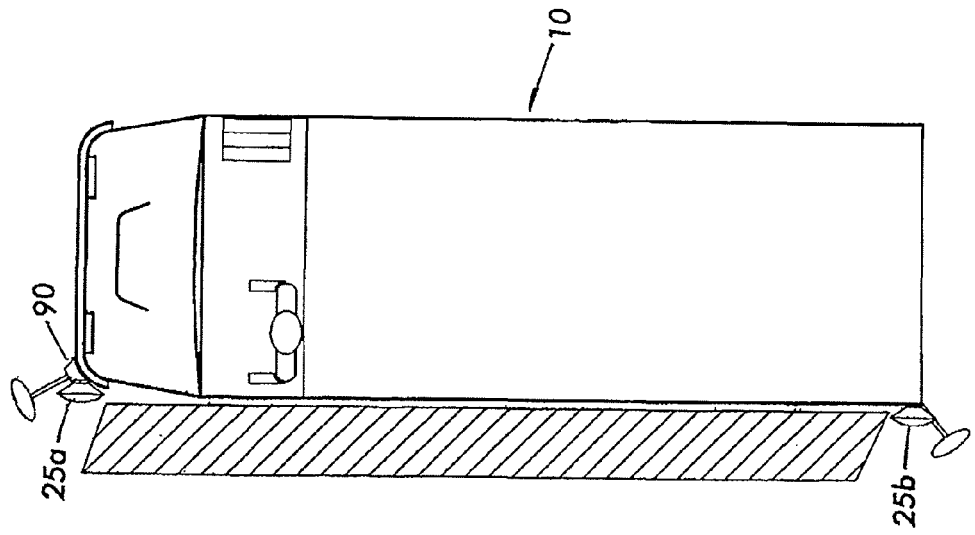
FIGS. 9A and 9B are top views illustrating lighting fixtures mounted on mirror mounts or mirror arm extending from the passenger side and the driver's side of the bus, according to an aspect of the present disclosure.
Figure 9B:
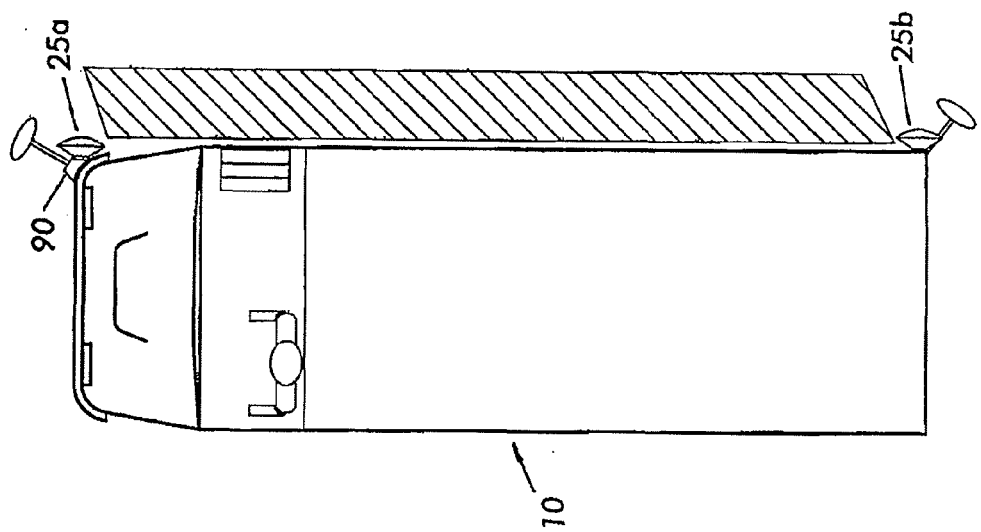

Also, as shown in FIGS. 9A and 9B, the floodlights or other types of lighting structures 25a and 25b may be provided on a mirror arm 91 (see FIG. 2) or a mirror mount 90 that extends from a side of the vehicle. Many school buses have mirrors mounted on ends of mirror arms that extend up and out from a side of the school bus. Such mirror arms and mounts can provide ideal positions for placement of the floodlights 25a and 25b because they are positioned above the zone that needs to be lit. Accordingly, a floodlight 25a may be positioned on a mirror arm positioned near the front of the vehicle and, if necessary, a second floodlight 25b may additionally be positioned on a mirror arm that is positioned near a back end of the vehicle. It will be understood that these floodlights 25a and 25b will be oriented such that the light is aimed and focused down toward the pavement to alert the driver about the presence of children without interfering with the visibility provided by the mirrors or visibility of the driver in general. Additional floodlights 25c may be positioned on the driver's side mirror arms or mirror mounts of the school bus as shown in FIG. 8B.

Figure 3:
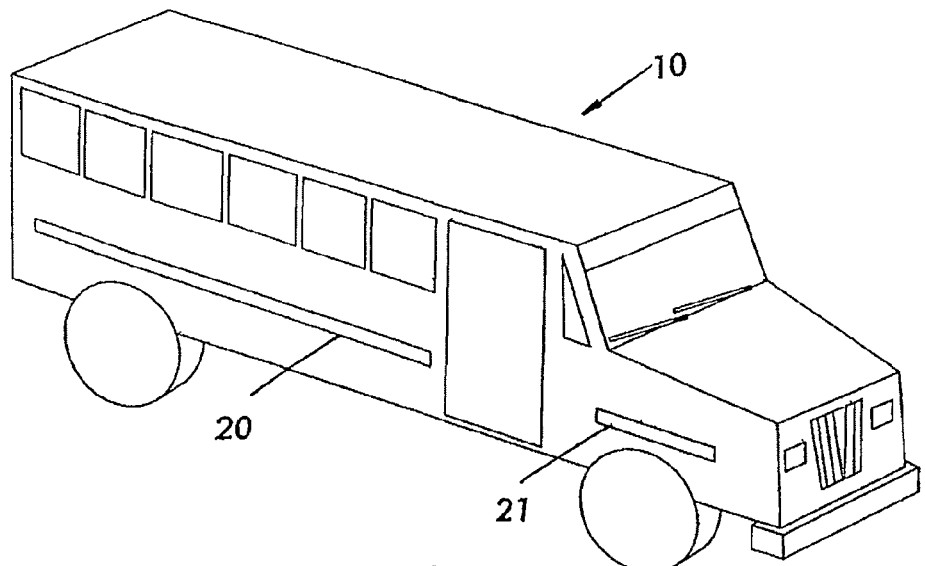
FIG. 3 is a perspective view of a school bus showing lighting strips mounted on a side of the school bus, according to an embodiment of the present invention.

FIG. 3 shows lighting strip 20 mounted on the side 11 of the school bus 10. FIG. 3 also shows an additional lighting strip 21 provided on the same side 11 of the school bus 10 closer to the front of the school bus 10. The lighting strip 20 and the additional lighting strip 21 may be provided as a series of LEDs to reduce cost and to eliminate having to frequently change light sources or power sources for the lighting strips. Also, LEDs provide a low light that does not interfere with the operation of the school bus 10 or the visibility through the mirrors (not shown) by which the school bus operator views the illuminated area. The LEDs may preferably provide a white light, however other colors may also be used.

The lighting strip 20 may be oriented slightly downward to focus the light to where it is most needed and to reduce interference with the school bus operator's visibility through the mirrors 8 or cameras 9 mounted on the exterior front fenders of the school bus 10. Thus, the entire lighting strip 20 may be mounted at a slightly angled manner to focus light downward, or the individual light sources within the lighting strip 20 may be arranged to focus light downward by means of their orientation or through the use of blinders or other light orienting apparatuses well known in the prior art. Although shown as a single lighting strip 20, the lighting strip 20 may be provided as a series of unconnected strips along the side 11 of the school bus 10 so long as sufficient illumination is provided to the illumination areas 30. Also, an additional lighting strip (not shown in FIGS. 3 and 4) may be provided on the other side 12 of the school bus 10 to prevent children, other people or objects from falling underneath the school bus 10 unbeknownst to the school bus driver. Further, a lighting strip 20 may be provided at the back side 13 of the school bus 10; and also at the front of the bus on the bumper looking down, to augment the headlights. The lighting strip 20 can provide various level of illumination depending on the time of day, whether infra-red cameras are being used, and the like. Thus, the level of light output can be controlled and, in some embodiments, may be of a low and/or minimal light level that infra-red or other types of cameras need for proper functioning.

Figure 4:
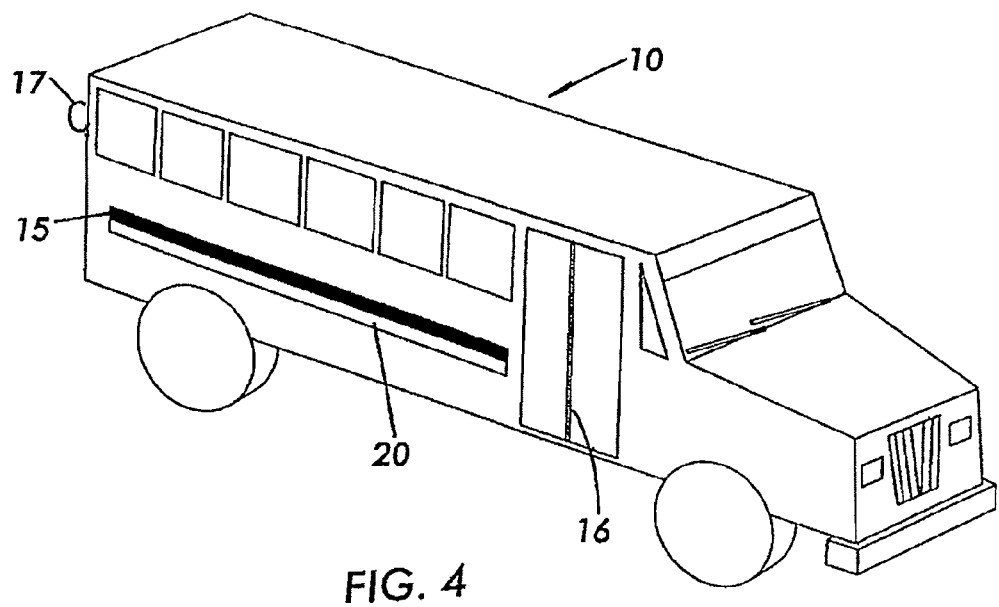
FIG. 4 is a perspective view of a school bus showing a lighting strip mounted on a side of the school bus under a side bumper, according to an embodiment of the present invention.

FIG. 4 shows lighting strip 20 mounted underneath bumper 15 of school bus 10. When school bus 10 is provided with bumper 15, mounting lighting strip 20 immediately underneath bumper 15 has the advantage of protecting lighting strip 20 from impact, precipitation or the like, and the effect of further preventing the diffusion of light upwards where it is unneeded and may interfere with visibility through the school bus mirrors.

Figure 5:
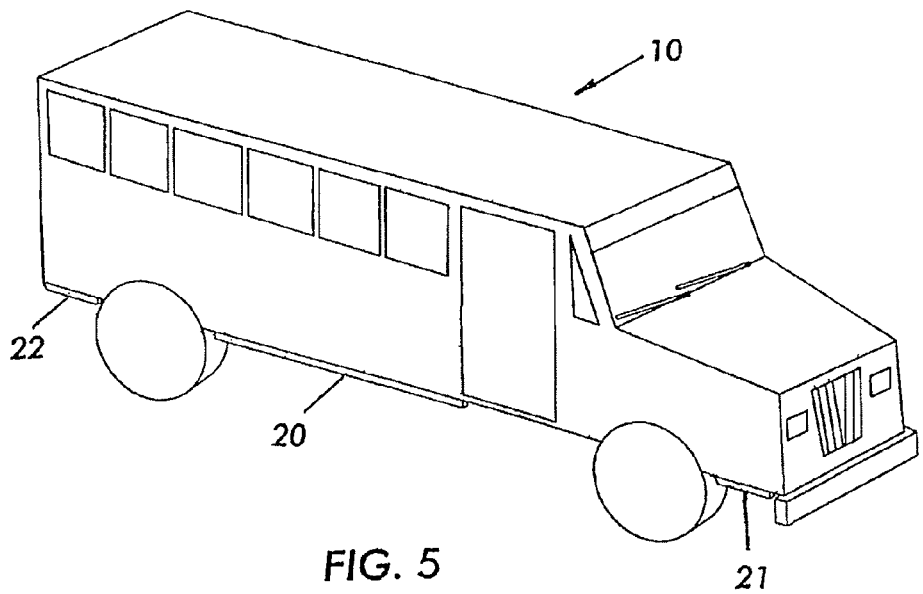
FIG. 5 is a perspective view of a school bus showing lighting strips mounted on an underside of the school bus along one side of the school bus, according to an embodiment of the present invention.

FIG. 5 shows a lighting strip 20 provided on the underside of the school bus 10. An additional lighting strip 21 also provided on the bottom of the school bus 10 near the front end. Further additional lighting strip 22 arranged on the bottom of the school bus 10 near the back may also be provided. It will be understood that similar lighting strips may be provided on the other side 12 and/or at the back side 13 of the school bus 10. Further, two such lighting strips may be provided, one along the side 11 as shown in FIG. 3 and one along the underside of the school bus 10 as shown in FIG. 5. Providing the lighting strip 20 on the underside of the school bus 10 focuses the illumination to where it is needed most and reduces the diffusion of light which may interfere with the visibility through the school bus mirrors, and locates the strip 20 at a location which protects it against damage.

In addition, the strip 20 may be removably mounted in sliding channels mounted to the bus, so that the lighting strips may be easily replaced for service, repair and other purposes.

Figure 7A:
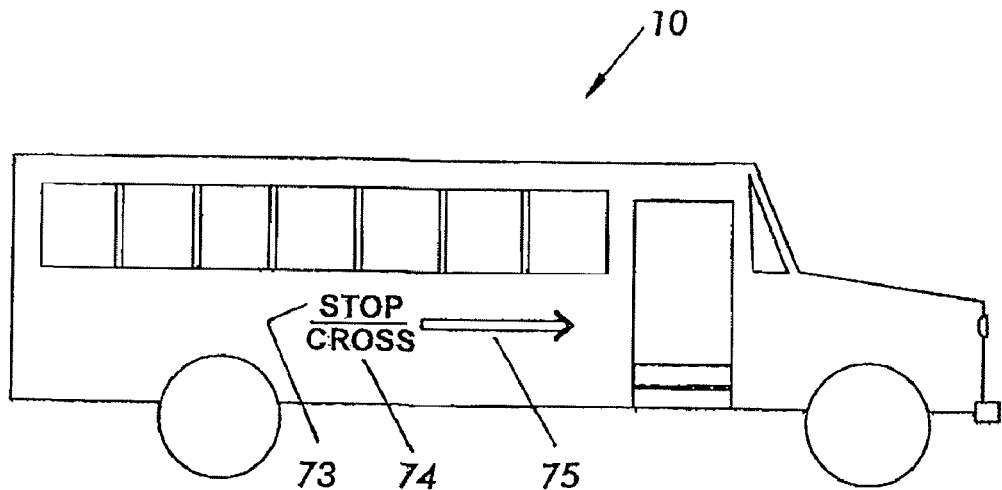
FIGS. 7A and 7B are side views illustrating lighting strips that provide arrows and words to guide children on the passenger side and the driver's side of the bus, respectively, according to an aspect of the present disclosure.
Figure 7B:
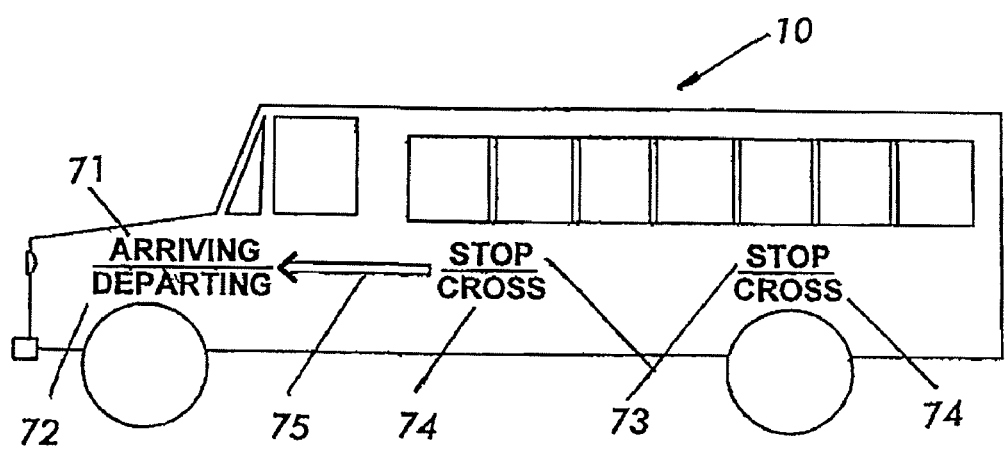

Also contemplated is a lighting strip 20 that is configured to signal words or arrows, as shown in FIGS. 7A and 7B. The lights of the lighting strip 20 may signal letters or a word such as "arriving" 71 to indicate the arrival of the school bus and to warn children away, to leave the curb until the school bus 10 has stopped while the arriving sign 71 is displayed or is flashing. Similarly, lighting strip 20 using the same or a different set of lights may signal a word such as "departing" 72 to alert children and other passengers to move away from the bus and to get on or stay on the sidewalk. Signal words such as "stop" 73 and "cross" 74 to warn passengers to stay or move away or to guide them, respectively, as is deemed necessary by the driver, may also be included. As shown in FIGS. 7A and 7B, each of these signals may be provided on either the passenger side or the driver's side, or both. In addition, such signs may also be provided on the back or front side of the vehicle. Such signs may be provided by use of lights of different colors, for example, red lights may be configured to display the stop word 73 while green lights may be configured to display the word "cross" 74. The arrow 75 may be displayed by a use of lights of a similar or different color pointing toward the front end of the bus to guide the children to cross in front of but not behind the school bus 10. Also, the arrow 75 may be displayed in different colors, such as green to indicate that it is safe to leave the sidewalk and red to indicate that the school bus is about to depart and that crossing is no longer safe. Alternatively, a steady light may indicate that it is safe to cross or to leave the sidewalk while a flashing light may indicate that it is not safe to do so (or vice versa). Such lights, in addition to guiding the children and their guardians, may also serve to alert other drivers to the presence of children and to remind them of the requirement that they not enter the children's crossing area near the school bus. The lighting strip 20 may also be wired to automatically display the letters or arrows based on the opening or closing of the door, and the events and conditions described with respect to other embodiments described herein.

Further, a clearly audible sound or noise may also be provided to accompany the displayed signs. For example, the sound may be a human voice advising of the arrival or departure of the school bus 10 to accompany the words 71 and 72, respectively, and advising that it is safe to cross accompanying the cross signal 74 or that it is unsafe to cross or to leave the sidewalk to accompany the stop symbol 73. However, other types of sounds may be provided such as a loud buzzing noise to indicate that the bus is arriving, departing, or that it is unsafe to cross to accompany the corresponding signs, and a friendly chirping noise or music to accompany the signs indicating that it is safe to cross or to leave the sidewalk.

Children or other passengers crossing the street to board or to disembark from the school bus present particular difficulties, owing to on coming vehicles or drivers who carelessly attempt to pass the stopped school bus from the rear and to the left of the school bus. To guard against such possibility, a pike or crossing gate 80 may be provided on the exterior of the school bus 10 on the side of the driver. FIG. 8A shows the telescoping crossing gate 80 in a contracted position that in addition is folded into or against the side of the school bus 10. Accordingly, the crossing gate 80 is provided so that when the school bus stops to allow children to board or to disembark, the crossing gate 80 may be deployed to an extended position as shown in FIG. 8B. Accordingly, vehicles behind the school bus would be provided an additional warning and a barrier and deterred from passing the school bus 10 during such times. Correspondingly, vehicles in oncoming traffic to the school bus would be additionally warned to stop by and away from the crossing gate 80. Moreover, children and guardians of children would learn that it is safe to cross the road only when they see the crossing gate 80 in the expanded deployed position as shown in FIG. 8B.

Figure 8D:
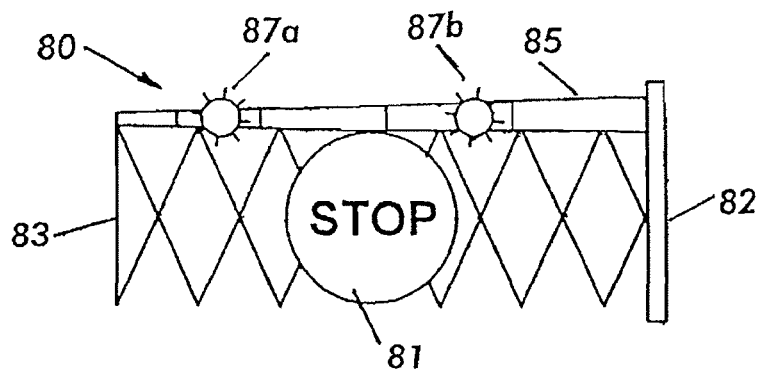

As shown in FIG. 8D, a stop sign 81 may be also provided on the back of or on the front (not shown) of the crossing gate 80 or on both the front and the back to further warn oncoming traffic of the likely presence of children. It will be appreciated that, while stop sign 81 is shown as circular, the more conventional octagonal-shaped stop sign or electronic lights such as one or more red lights or an electronic display spelling out a message such as "stop" or the like in English and/or in other languages may be provided in addition to or instead of the conventional stop sign 81. One or more flashing or steady lights 87a-87b, emitting white light or colored lights may also be positioned on the crossing gate 80 and may be activated when the crossing gate 80 is deployed to highlight the stop sign 81 to warn motorists.

As shown in FIG. 8D, the crossing gate 80 consists of a mesh of crisscrossing bars 83 which allow the expansion and contraction of the crossing gate 80. In addition, a hinge unit 82, shown in FIG. 8D, is provided to secure the crossing gate 80 to the side of the school bus 10. Further, the crossing gate 80 may be made to expand and to contract by the driver by electronic signaling provided at the driver's station. For example, a telescoping bar 85 with a hydraulic activator may be provided to expand the crossing gate 80 when the school bus 10 is stopped and then to contract it when the boarding and disembarking of the passengers is complete. The mesh of crisscrossing bars may be covered with an expanding soft material to protect it against the elements or to improve its appearance.

Similarly, the hinge 82 may pivot in the crossing gate 80 to align the crossing gate 80 very close to or in immediate contact with (flush with) the exterior of the driver's side of the school bus 10 by electronic means. For example, the unfolding of the crossing gate 80 to a near 90 degree position with respect to the outer surface of the exterior of the driver's side of the school bus 10 and the expansion of the crossing gate 80 by the telescoping out of the hydraulic bar 85 can be initiated by the driver's pressing of a single button when the driver deems it safe to cross the road. Alternatively, the crossing gate may be deployed by unfolding and expanding automatically after the doors of the school bus are opened, or when the lighting strip 20 is activated. Also, a distal end of the crossing gate 80 may be snap into a corresponding receiving tongue 89, or a set of more than one such tongues, positioned on the exterior of the side of the school bus 10 to secure the crossing gate 80 while the school bus 10 is in motion.

The crossing gate 80 may be provided at a level low enough to physically block or come close to physically blocking the passage of passenger vehicles in the lane(s) adjacent to the driver's side of the school bus 10. Alternatively, the crossing gate may be positioned at a greater height to be clearly visible in the line of sight of taller vehicles. The crossing gate 80 may extend far enough out to block substantially all or most of the lane(s) adjacent to the school bus 10 on the driver's side. However, it will be appreciated that it may be sufficient to have the crossing gate 80 expand enough to block about a third, a half, or two-thirds of that lane. Also, while the stop sign 81 is shown as being positioned near the middle of the crossing gate 80 when in the expanded position, the stop sign 81 may be positioned off center, and in addition may be positioned to hang below the crossing gate 80. If positioned below the crossing gate 80, the stop sign 81 would provide a larger visible area to warn off vehicles against passing the children's zone. It will be recognized that the crossing gate 80 may be painted bright colors, such as red, yellow or safety orange, or a combination of such colors to maximize the effectiveness of the warning. In addition, a sound alert may also be provided while the crossing gate 80 is in the expanded open position and during the expansion and contraction of the crossing gate 80. For example, a buzzing sound or a sound emulating a human voice cautioning vehicles to stop or alerting vehicles about the presence of children, or a voice signaling to children that it is safe to cross the street may be provided.

Figure 10A:
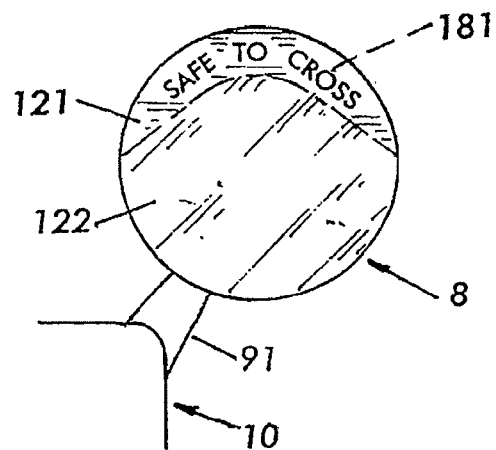
FIGS. 10A and 10B are perspective views of cross-view mirrors that include status and guiding information, according to an aspect of the present disclosure.
Figure 10B:
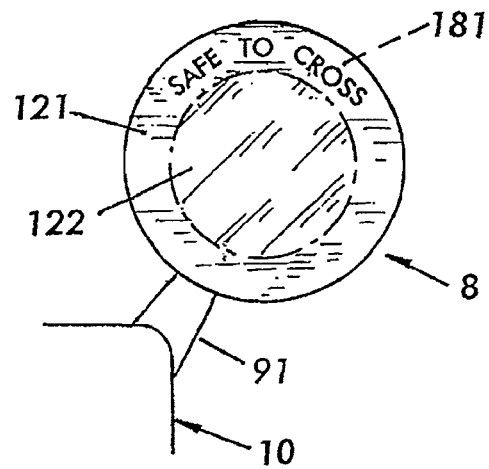

A mirror or a set of mirrors may further include the system for providing vehicle status information and guidance to passengers and pedestrians as shown in FIGS. 10A and 10B. One or more mirrors, such as a cross-view mirror 8 shown in FIGS. 10A and 10B, or an oval mirror positioned on a hood or other exterior portion of the vehicle, such as for example at a passenger's side or a driver's side at the front, or at a passenger's side or driver's side along the side or near the back of the vehicle, or a rear-view mirror positioned inside the driver's cabin, may include a lighting mechanism or a lighting strip or a light that provides the status information and guide information providing portion 181. Such a system may work alone or in concert with the lighting strip 20 positioned on the outside of the vehicle or with other lighting mechanisms or other lighting strips as described herein.

As shown in FIG. 10A, the mirror may include a top portion 121, a see-through glass portion, above the mirror face 122 of mirror 8. Mirror 8 is shown as the mirror attached to the front hood of the vehicle 10, but the status information and guiding information providing portion 181 may be attached to or formed as part of any of the other mirrors of the vehicle 10. Behind the top portion 121 may be positioned the status information or guide information providing portion 181. Such a status information or guide information providing portion 181 may comprise an LED, LCD, digital display means, or a series of lights, light strips, or light sources arranged to provide passengers in the vehicle or pedestrians outside the vehicle with information about the status of the vehicle or guiding information, about, for example, whether it is safe to cross. For example, as shown in FIG. 10A, the status information and guiding information providing portion 181 may clearly display or flash the letters "SAFE TO CROSS" to indicate that the vehicle has come to a full stop, the school bus lights are flashing and it is safe to board or disembark from the vehicle 10. Such a system may work in conjunction with the lighting strip 20 provided on the side of the vehicle to illuminate the area adjacent to or near the vehicle 10.

FIG. 10B shows an embodiment in which the status information and guiding information providing portion 181 is formed under a transparent glass portion 121 around the circumference of the mirror face 122 of the mirror 8. However, the status information and guiding information providing portion 181 may also be provided on or as an integral part of the frame of mirror 8. As explained in connection with the other signs that are provided, the status information and guiding information providing portion 181 provided on mirror 8 may also provide other types of visual or audio, or a combination of visual and audio information such as "DO NOT CROSS," "CHILDREN CROSSING," "STOP," "STOP REQUESTED," "ARRIVING AT STOP," "NOW DEPARTING," "NEXT STOP IN 10 SECONDS," "DOORS CLOSING," "DOORS OPENING," "STAND BACK," "STAND AWAY FROM THE BUS," or the like. The status information and guiding information providing portion 181 may also include a countdown timer indicating when the vehicle 10 will depart or when the vehicle's doors will close, or indicating when the vehicle 10 will come to a stop, at which point it is safe to move about or to disembark from or board the vehicle 10. Such a countdown timer may be provided in addition to, or instead of, one or more of the foregoing signs and may be provided in the form of seconds being decreased or increased shown on the status information and guiding information providing portion 181, or as one or more colored lights such as, for purposes of illustration, green to indicate ample time left, yellow to indicate little time left, and red to indicate stop or no time left. It will be understood that many such combinations are possible, for example a steady light may indicate ample time left and a flashing light may indicate little time left or the like. Further, in addition to the status information and guiding information providing portion 181 being provided as shown in FIGS. 10A and 10B, it may also be provided on the arm 91 of the mirror or at the base of the arm 91 of the mirror 8 (where the arm attaches to the stationary portion of the vehicle 10).

Similarly, each of these signs maybe accompanied by audio information, such as a human voice enunciating these words, or a noise or a sound to guide passengers and pedestrians about each of these signs. Also, signs in more than one language or more than one writing system may be provided. In addition, instead of writing, lights or different colored lights may be provided, such as a red light for "STOP" or "MOVE AWAY FROM THE BUS," versus a green light for "SAFE TO CROSS" or the like. Thus, what is contemplated is a system in which such signs on mirrors alone, or on vehicle side lighting strips 20, or on a combination of the foregoing are provided to educate pedestrians around the vehicle, passengers on the vehicle including children, and other vehicle drivers about the status of the vehicle. Thus, an aspect of a system according to the present disclosure is to promote pedestrian and passenger awareness and safety education, in addition to promoting safety.

Also contemplated is an embodiment in which different colored lights are used to indicate various types of information. For example, red lettering may show messages that prohibit certain activities, such as the message "DO NOT CROSS," while green lettering may be used for messages such as "OKAY TO CROSS" or other allowed activities. In addition, one color lettering may be used to display messages about vehicle operation and safety, such as messages about crossing and boarding, while another color lettering may be used to show messages about less grave matters, such as the countdown timer indicating arrival and departure, which may be provided as an educational tool or as a tool to expedite boarding and disembarking. Alternatively, red lettering may be used to show messages such as "DON'T WALK," or "STAND AWAY FROM THE VEHICLE," whereas green lettering may be used to show the countdown timer indicating when the doors will next be opened.

Figure 6:
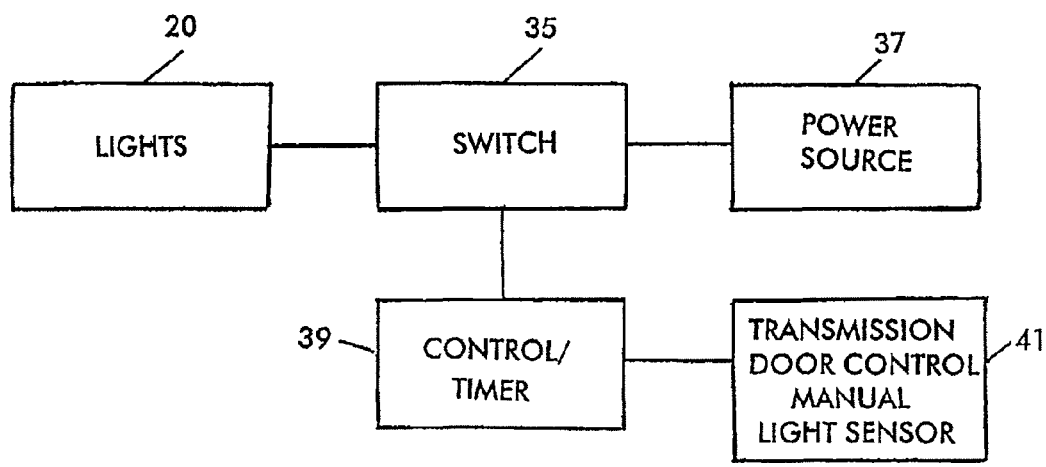
FIG. 6 is a block diagram of a controller for the light system of the present disclosure.

Also provided is a control illustrated in FIG. 6 for the lighting strip 20, the floodlights 25a-25c, the crossing gate 80, and/or the mirror status information 181. For example, the lighting strip 20 may be switched on automatically via switch 35 which interfaces with a power source 37, with the opening of the door 16, such as by the turning on of the light in the stairwell of the door of the school bus 10 by operation of the door control (not shown). Further, the lighting strip 20 may be turned on when the flashing light 17, provided, for example, at the rear side 13 of the school bus 10 or on other surfaces, is turned on. Alternatively, the school bus driver may separately turn on or off the lighting strip 20. As another alternative, the control 39 may respond to the vehicle's transmission state, e.g., park, drive, etc., as illustrated by control source 41.

The lighting strip 20 may be turned off manually or using a control/timer 39 that is started after the door 16 is closed or the flashing light 17 is turned off. For example, the lighting strip 20 may be turned off approximately ten seconds, thirty seconds or two minutes after the door 16 is closed or the flashing light 17 is closed, or at some predetermined time. Alternatively, the lighting strip 20 may be turned off contemporaneously with the closing of the door 16 or the turning off of the flashing light 17.

Figure 11:
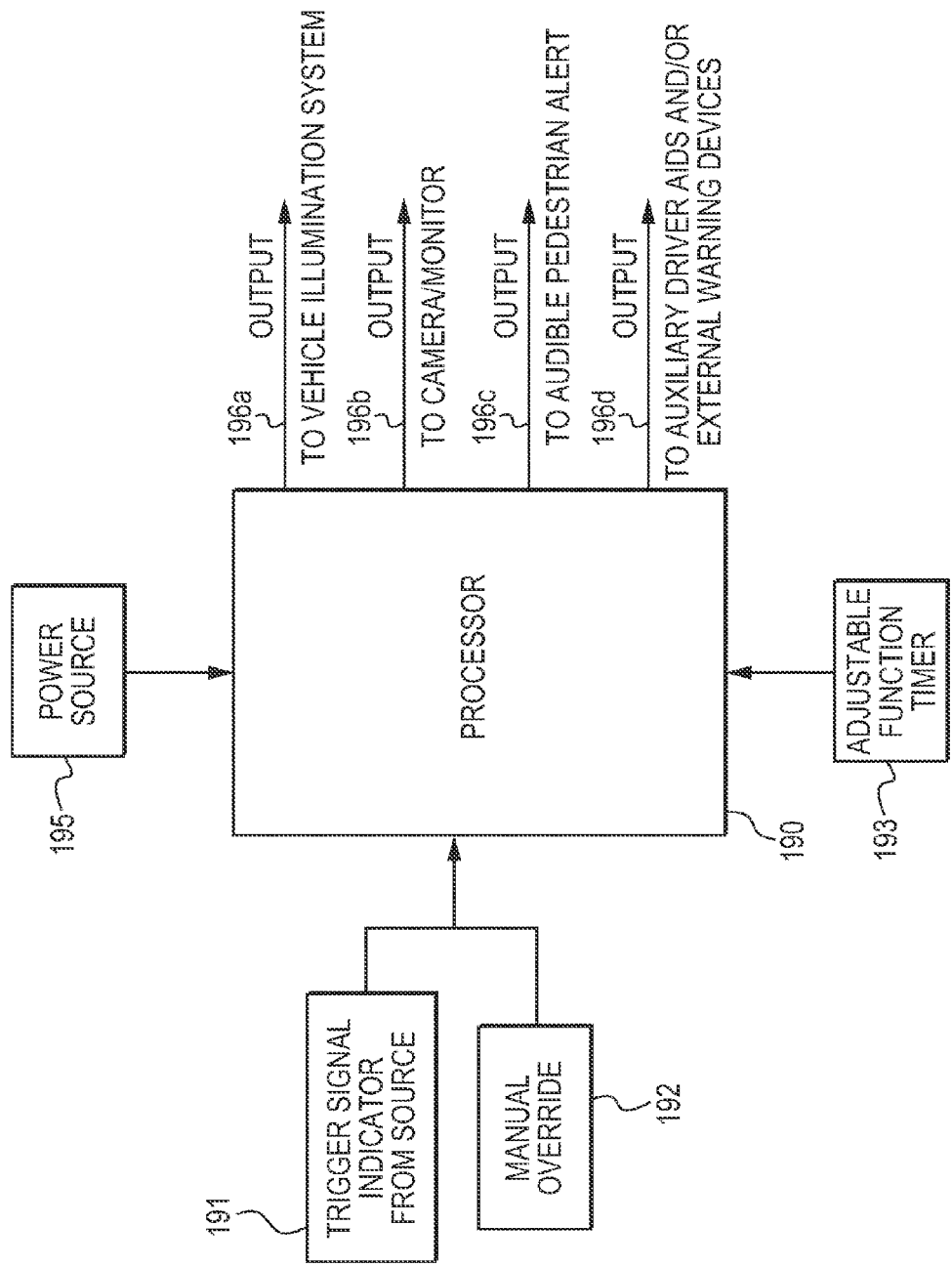
FIG. 11 is a schematic illustration of a control system for the lighting system according to an aspect of the present invention.

FIG. 11 is a schematic illustration of a control system for the external illumination system according to an aspect of the present invention. Processor 190 receives input from trigger signal indicator 191, such as, for example, the shifting of the school bus 10 from a park gear to a first gear (or vice versa), the opening or closing of a vehicle door, the turning on or off of one or more amber or red flashing school bus light to indicate boarding/disembarking, or the like. Processor 190 also receives input from manual override 192, which allows a driver to control the external lighting, audible alerts and external warning devices or the like, for example, by opening a vehicle door, or the like. A power source 195 provides power to processor 190. Also, adjustable function timer 193, for example a processor clock, can be adjusted to provide timing signals for the processor 190 for controlling functions that require timing.

Processor 190 may provide integrated control over the camera, monitor, lighting, audible alert, countdown display and other external warning systems of the vehicle. Accordingly, processor 190 controls the ON/OFF state and operation of the vehicle lighting system, including lighting strips 20 and/or the floodlights 25, through output 196*a*, the ON/OFF state and operation of the external cameras (and internal camera) and monitor systems for viewing the fields of views of the cameras through output 196*b*, the ON/OFF state and operation of the audible pedestrian alert system, such as the audio alert system for passersby and passengers boarding or disembarking from the school bus 10 through output 196*c*, and the ON/OFF state and operation of auxiliary driver aids or other external devices, for example, the flashing amber or red school bus light, the crossing gate 80 or stop sign mounted from the exterior of the vehicle, or the like, through output 96*d*. Thus, as discussed, when the school bus door is opened, processor 190 receives a trigger signal from trigger signal indicator 191, and the processor 190 may then activate a passenger boarding mode, which could entail turning on the red or amber flashing school bus lights, the turning on of lighting strip 20, the start of countdown display, the deployment out of the crossing gate 80, the turning on of an audible sound to inform passengers or those waiting to board that it is safe to approach the school bus or to cross the street, the switching on or the selection among exterior cameras and the like. Similarly, the receipt of a signal indicating the closing of the door of the school bus 10 may cause the processor 190 to output a different set of instructions via outputs 196*a*-196*d*.

Although shown for illustration as separate individual outputs, outputs 196*a*-196*d* may be provided as a single signal bus, or may be provided as an output interface that communicates via a wired or wireless connection with the systems that control the above-discussed systems controlled by processor 190. Also, these controlled systems may provide feedback signals or messages to processor 190, to indicate a receipt/non-receipt of a signal, message or command, a failure or malfunction of the controlled system, a light sensor reading or other external condition, or the like.

The lighting system, including the lighting strips 20-22, the floodlights 25*a*-25*b*, the crossing gate 80, and/or the mirror status information 181, may be activated or deactivated automatically when movement is detected near the school bus 10. For example, LADAR (laser radar), infrared laser, or other detection systems may detect the presence or the movement of children or other passersby in an area near, adjacent or under the school bus 10, and the lighting system, or a relevant portion thereof, may thereby be automatically be triggered via processor 190. In addition, or in the alternative, a light meter or other sensor for detecting an amount of light or visibility condition may be provided at the school bus to trigger the lighting system when the visibility falls below a minimum acceptable range.

In addition, the signal processing system may provide an audible indication to a school bus driver, for example, a buzzing sound as long as the lighting strips 20-22 or floodlights 25*a*-25*b* is turned on.

Figure 12:
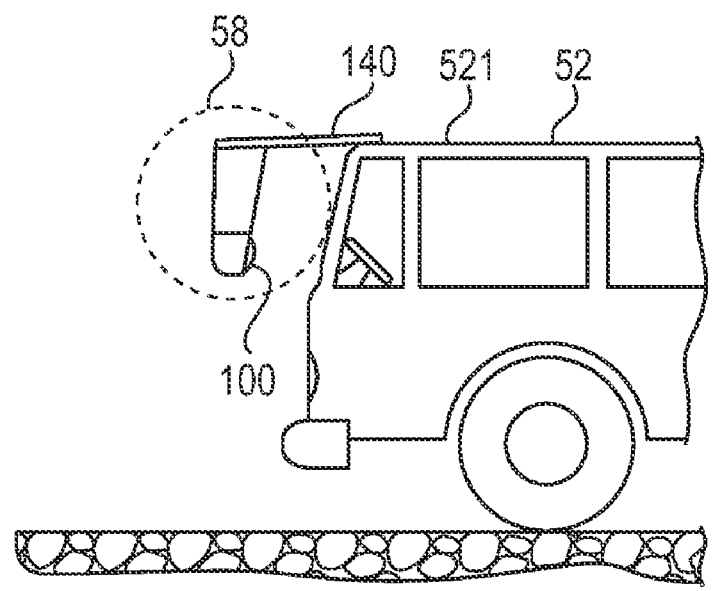
FIG. 12 is a side view line drawing illustrating a mirror assembly attached to a bus according to an aspect of the invention.

Further, as shown in FIG. 12, mirror 100 may be mounted to the vehicle or bus 52 in other ways, such as to the front portion of the roof 521 of the vehicle with one end of vehicle mirror mount 140 secured to or near the roof 521 of bus 52 and projecting forward so that the other end of vehicle mirror mount 140 secures cross-view mirror assembly 58.

Figure 13:
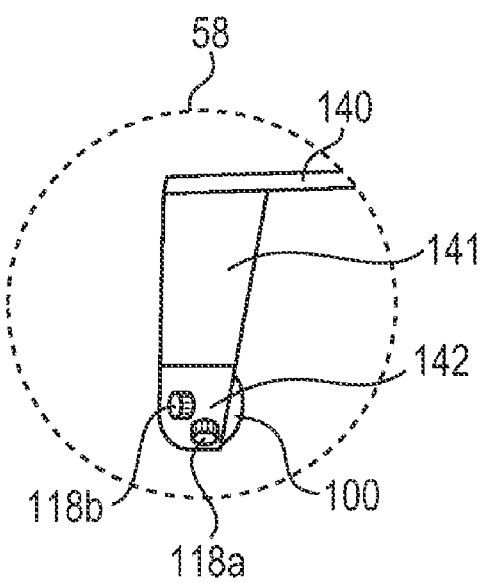
FIG. 13 is a side view line drawing illustrating a the mirror assembly showing the mirror housing and sensors according to an aspect of the invention.

FIG. 13 shows cross-view mirror assembly 58, including the front portion of vehicle mirror mount 140 from which hangs rear-view mirror housing 141, which can house a rear-view mirror (not shown) conveniently positioned in front of the bus driver (not shown) and cross-view mirror housing 142 positioned below rear-view mirror housing 141 and housing mirror 100, shown here as a cross-view mirror. It will be understood, however, that cross-view mirror assembly 58 may include only the cross-view mirror and not the rear-view mirror or may include only the rear-view mirror or its housing, and may include additional mirrors, such as side view mirrors (not shown).

FIG. 13 also shows sensors 118*a* and 118*b* positioned, in this example, at or near the bottom of cross-view mirror housing 142 and on a side of cross-view mirror housing 142, respectively. Sensors 118*a* and 118*b* may be light sensors to control, as discussed herein, the reflectivity of mirror 100 or the rear-view mirror. Alternatively, one such sensor 118*a* or 118*b* may suffice. In addition, one or more such sensors may be positioned elsewhere on the cross-view mirror assembly 58 or at other portions of vehicle 52 or at or on other mirrors of bus 52. In the alternative, sensors 118*a* and 118*b* may be a light sensor and a motion sensor, respectively, the motion sensor provided to control the reflectivity of mirror 100 based on the motion of the bus, as discussed above.

Figure 14:
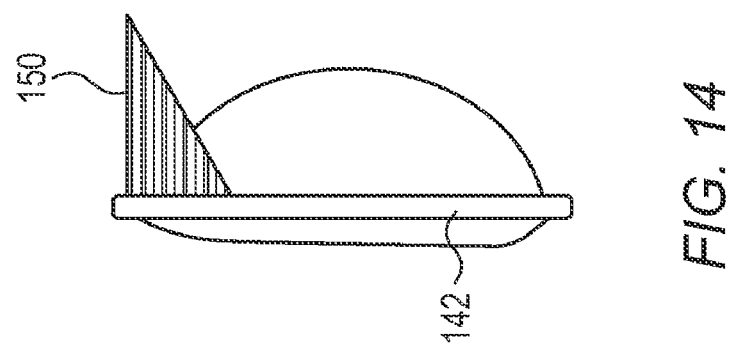
FIG. 14 is a side view line drawing illustrating a mirror with a visor according to a further aspect of the invention.

FIG. 14 shows visor 150 positioned to shield a top portion of mirror 100 provided as part of cross-view mirror housing 142. Visor 150 can be thus positioned to shield mirror 100 from direct sunlight and may thus provide better visibility for the driver during driving and when bus 52 is stopped and passengers or passersby are entering the field of view of mirror 100. In addition, one or more sensors 118*a* and 118*b* may be positioned underneath visor 150 to provide a more accurate reading of the ambient light as it is experienced by the driver looking at mirror 100 as shielded by visor 150.

Figure 16:
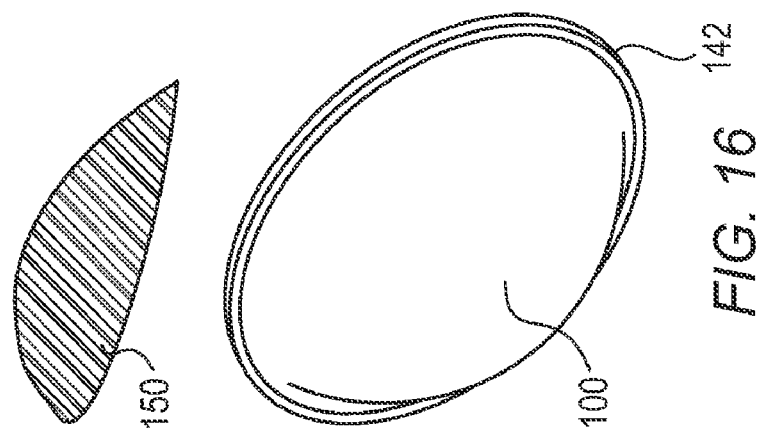
FIG. 16 is a perspective view line drawing illustrating the mirror detached from the visor according to this further aspect of the invention.
Figure 15:
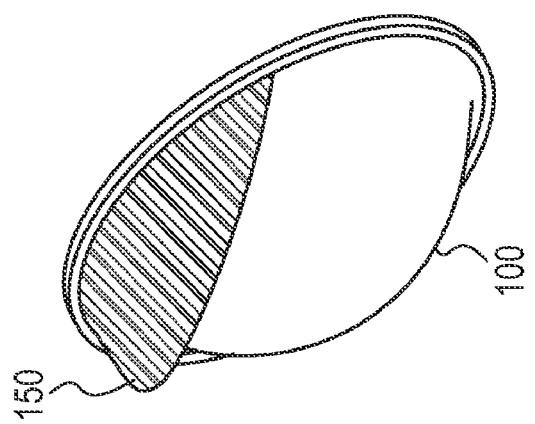
FIG. 15 is a perspective view line drawing illustrating the mirror with the visor according to this further aspect of the invention.

FIG. 15 is a perspective view that shows visor 150 positioned to shield a top portion of mirror 100 provided as part of cross-view mirror housing 154. FIG. 16 is a perspective view that shows visor 150 detached from mirror 100.

Figure 17:
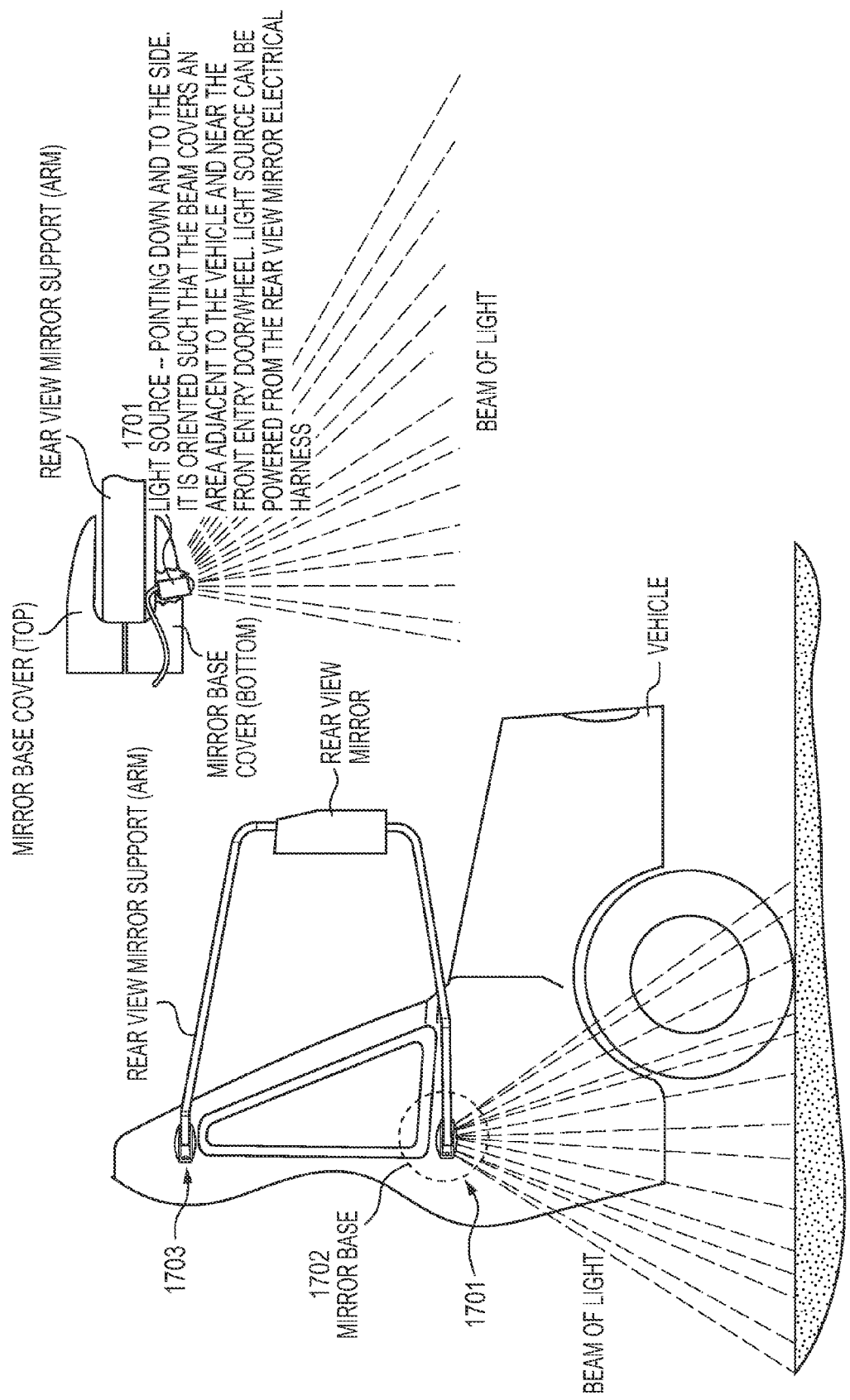
FIG. 17 is a side view line drawing illustrating a mirror assembly with a light source attached to a bus according to this further aspect of the invention.

FIG. 17 is a side view line drawing illustrating a mirror assembly with a light source attached to a bus according to this further aspect of the invention. In this embodiment light source 1701 is attached to the lower mirror base 1702 mounted on the school bus 10. The light source 1701 is focused down to illuminate the pavement or the space just above the pavement along the side 11 of the school bus 10. Although one light source is shown in FIG. 17, it will be understood that more light sources may be provided as necessary to illuminate the area. The light source 1701 may be provided as halogen lamps, strobe lights, incandescent bulbs, neon lights, LEDs, other type of lighting sufficient to provide the illumination necessary, preferably without blinding the driver of the vehicle 10, the driver of adjacent vehicles, or passengers entering or exiting the school bus 10. As noted in the expanded detail of FIG. 17, light source 1701 can be powered from the rear view mirror electrical harness. In addition, light source 1701 can be powered through its own electrical harness, batteries, solar panels, or other well known electrical power sources.

FIG. 17 shows light source 1701 attached to the lower mirror base 1702 mount on the school bus 10. It will be understood that the light source 1701 could be attached to the higher mirror base mount 1703, the mirror support arm 1704, or the rear view mirror housing 1705. In addition, it will be understood that the light source 1701 can be mounted within, or partially within, the mirror base cover (as indicated in FIG. 17) or the mirror housing. In addition, it will be understood that light source 1701 can be mounted to the exterior of the mirror base mount 1703, the interior of the mirror housing that can include an opening or additional transparent portion for the light to exit therefrom and/or the mirror housing 1705.

Many school buses have mirrors mounted on ends of mirror arms that extend up and out from a side of the school bus. It has been determined that such mirror arms and mounts can provide advantageous and ideal positions for placement of the light source 1701 because they are positioned above the zone that needs to be lit. Accordingly, a light source 1701 may be positioned on a mirror arm positioned near the door of the vehicle and, if necessary, light sources may additionally be positioned on a mirror mount or a mirror arm that is positioned near an additional door in the vehicle. Additionally, a light source 1701 may also be mounted in close proximity to where the mirror arms are attached to the frame of the schools bus. In this embodiment it is advantageous to reuse the mounting pillar, access holes, and other modifications to the school bus for mounting the light source 1701. This embodiment has the advantage of the light source being shielded from the driver in a manner that prevents or inhibits lights from shining in the driver's eyes. Alternatively, light source 1701 may be mounted on a the side of the school bus using an access point that is completely independent from the mirror arm mount. For example, various structural sections along the side of the bus and/or mounting positions used for other attachments and/or signage on the side of the bus may be used to mount light source 1701. Advantageously, in alternative embodiments, the light source 1701 may be mounted adjacent to a cowl mounted signal lamp, such as a cowl mounted signal lamp having a barrel shaped structure with a scalloped cut out and flasher facing forward. In this embodiment, the light source 1701 could be mounted below the signal lamp to take advantage of the signal lamp shielding light from the light source 1701 that could obstruct the vision of the driver.

It will be understood that the light source(s) will be oriented such that the light is aimed and focused down and to the side of the vehicle. This points the light source 1701 toward the pavement adjacent to the vehicle to alert the driver about the presence of children and other impediments near the ground adjacent to the school bus without interfering with the visibility provided by the mirrors or visibility of the driver in general. In addition, in some embodiments, the light source 1701 is not aimed completely vertically toward the ground, but the light source 1701 is positioned to also illuminate the areas to the side of the bus where the passengers enter and exit the school bus and allow the driver to more clearly see those persons, as well as possibly the front and/or rear of the bus. This will additionally provide illumination for passengers entering or exiting the school bus and assist in the prevention of trip and falls over articles on the ground near the school bus.

According to a further aspect of this embodiment, one or more of the light sources 1701 may automatically sweep the area on a frequent basis, or may be directed at the discretion of the school bus driver. Alternatively, one of the light sources may sweep the area back and forth or may be controlled and directed by the school bus driver with the other light sources remaining fixed. It will be understood that, as with the lighting strips 20 and the floodlights 25a-25c, light sources 1701 may be provided at one or more doors located at any side of the school bus 10 and may be controlled to turn on and off in a manner similar to the lighting strip embodiment. Further, a combination of floodlights 25a-25c, lighting strips 20-22, and light sources 1701 may be used on the same school bus 10 mounted at different places on the school bus 10. Thus, for example, floodlight 25b may be provided as a source of illumination steerable or directable by the school bus driver, lighting strips 20-22 provided along the side or on the bottom of the school bus 10, and light sources 1701 provided near a door on the school bus 10.

The light source 1701, like the lighting strips 20-22 and the floodlights 25a-25b, may be activated or deactivated automatically when movement is detected near the school bus 10. For example, LADAR (laser radar), infrared laser, or other detection systems may detect the presence or the movement of children or other passersby in an area near, adjacent or under the school bus 10, and the lighting system, or a relevant portion thereof, may thereby be automatically be triggered via processor 190. In addition, or in the alternative, a light meter or other sensor for detecting an amount of light or visibility condition may be provided at the school bus to trigger the lighting system when the visibility falls below a minimum acceptable range.

FIG. 17 shows the light source 1701 as being powered by the rear view mirror electrical harness. In an alternative embodiment the light source 1701 could be powered by an electrical harness independent of any other electrical devices mounted on the lower mirror base 1702, the higher mirror base mount 1703, the mirror support arm 1704, or the rear view mirror housing 1705. This embodiment provides a redundant electrical path to provide illumination when on of the electrical harnesses has a fault. The power for the electrical harness may provided from the main electrical bus of the vehicle. Alternatively, an independent power source for the electrical harness may be used. Independent power sources could include a engine/wind/wheel based charging system and battery separate from the vehicle's main charging system. Again, this would provide a redundant source of power and light in case of an electrical fault elsewhere in the vehicle. Other possible independent power sources for the electrical harness do not require vehicle movement, such as solar cells or fuel cells.

Figure 18:
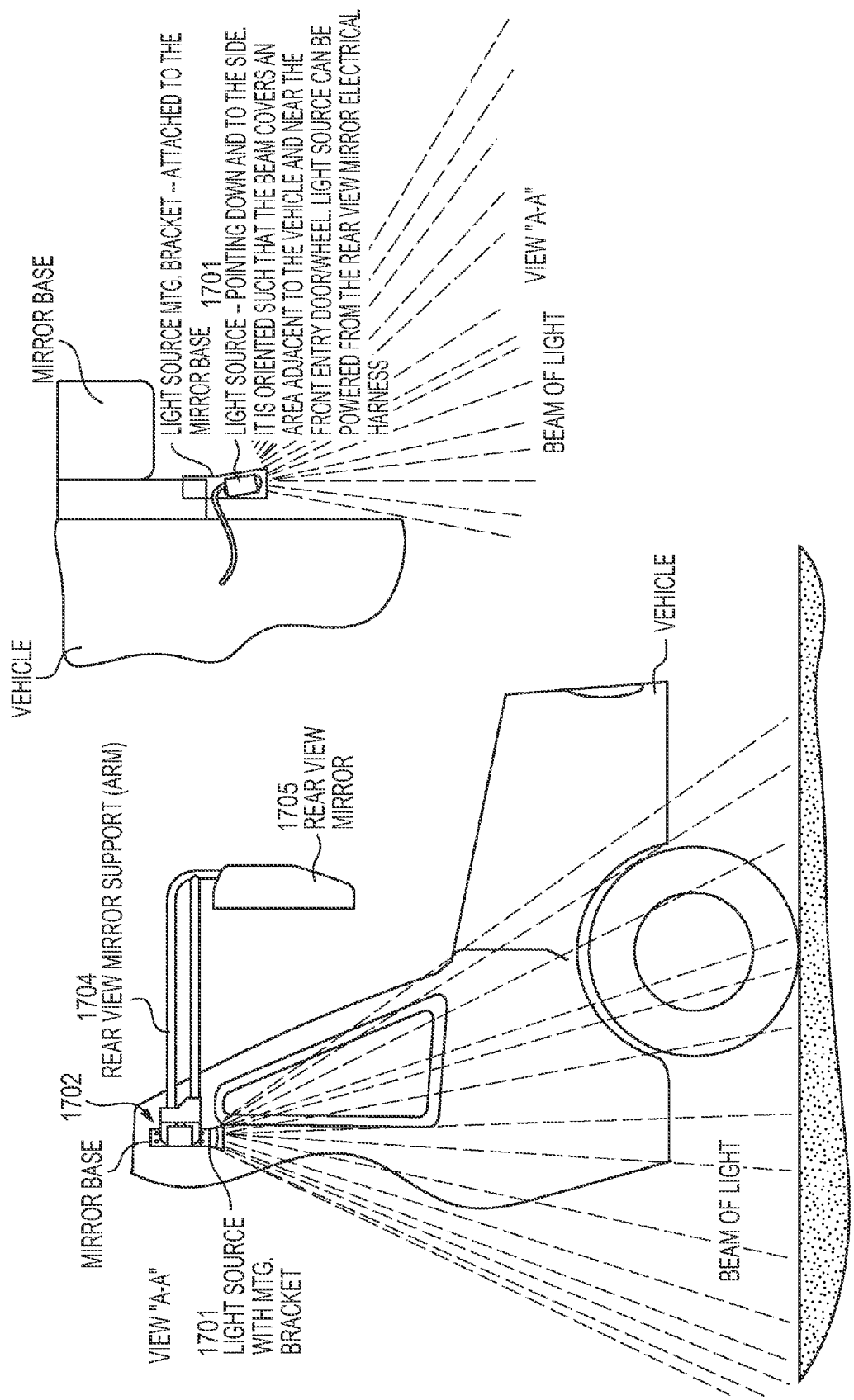
FIG. 18 is a side view line drawing illustrating a mirror assembly with a light source attached to a bus according to this further aspect of the invention.

FIG. 18 is a side view line drawing illustrating a mirror assembly with a light source attached to a bus according to a further aspect of the invention. This figure shows light source 1701 attached to a single mirror base 1702. As discussed above, it will be understood that light source 1701 could be attached to the mirror base mount 1702, the mirror support arm 1704, and/or the rear view mirror housing 1705. In addition, it will be understood that the light source 1701 can be mounted within, or partially within, the mirror base cover as indicated in FIG. 17. Like the embodiment described in FIG. 17 discussed above, the light source 1701 shown in FIG. 18 may be positioned on a mirror arm positioned near the door of the vehicle and, if necessary, light sources may additionally be positioned on a mirror mount or a mirror arm that is positioned near an additional door in the vehicle. It will be understood that the light source(s) will be oriented such that the light is aimed and focused down toward the pavement adjacent to the vehicle to alert the driver about the presence of children without interfering with the visibility provided by the mirrors or visibility of the driver in general. This will additionally provide illumination for passengers entering or exiting the school bus. Additionally, one or more of the light sources 1701 may automatically sweep the area on a frequent basis, or may be directed at the discretion of the school bus driver. Alternatively, one of the light sources may sweep the area back and forth or may be controlled and directed by the school bus driver with the other light sources remaining fixed.

FIG. 19A is a side view exploded line drawing illustrating a mirror assembly with a light source attached to a bus according to a further alternative embodiment of the invention. This figure shows additional details of the light source 1701 attached to a mirror base 1702 mounted on a school bus 10. In particular, the light source 1701 is attached to a light source mounting bracket 1901. The mounting bracket 1901 is then attached to the mirror base 1702. The mounting bracket 1901 is designed to be attached to multiple versions of the mirror base 1702. Advantageously, in accordance with these optional embodiments, mounting holes used to mount the bracket to the vehicle are also used to mount the lighting assembly to the mounting bracket. In at least one embodiment, the lighting assembly is connected to the vehicle using the same bolts that connect the mounting bracket to the vehicle. Alternative attachment mechanisms may alternatively be used. For example, different mirror bases 1702 are disclosed in FIGS. 17 and 18.

FIG. 19B is a side view line drawing of FIG. 19A showing the light source 1701 attached to a mounting bracket 1901 which is attached to a mirror base 1702. This figure shows two bolts used to attach the mounting bracket to the mirror base 1702.

Figure 19:
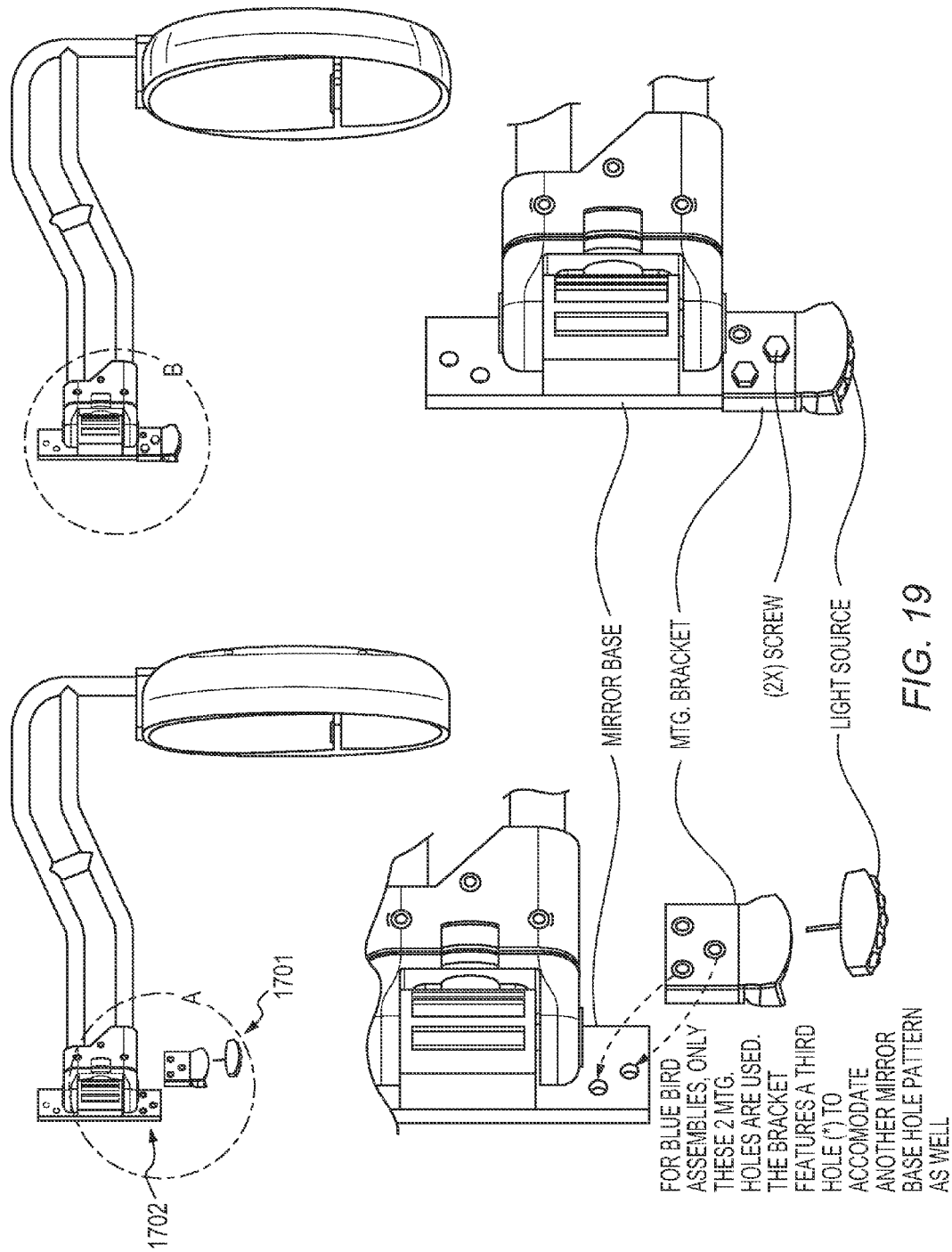
FIG. 19 is a side view line drawing illustrating a mirror assembly with a light source attached to a bus according to a further aspect of the invention.
Figure 20:
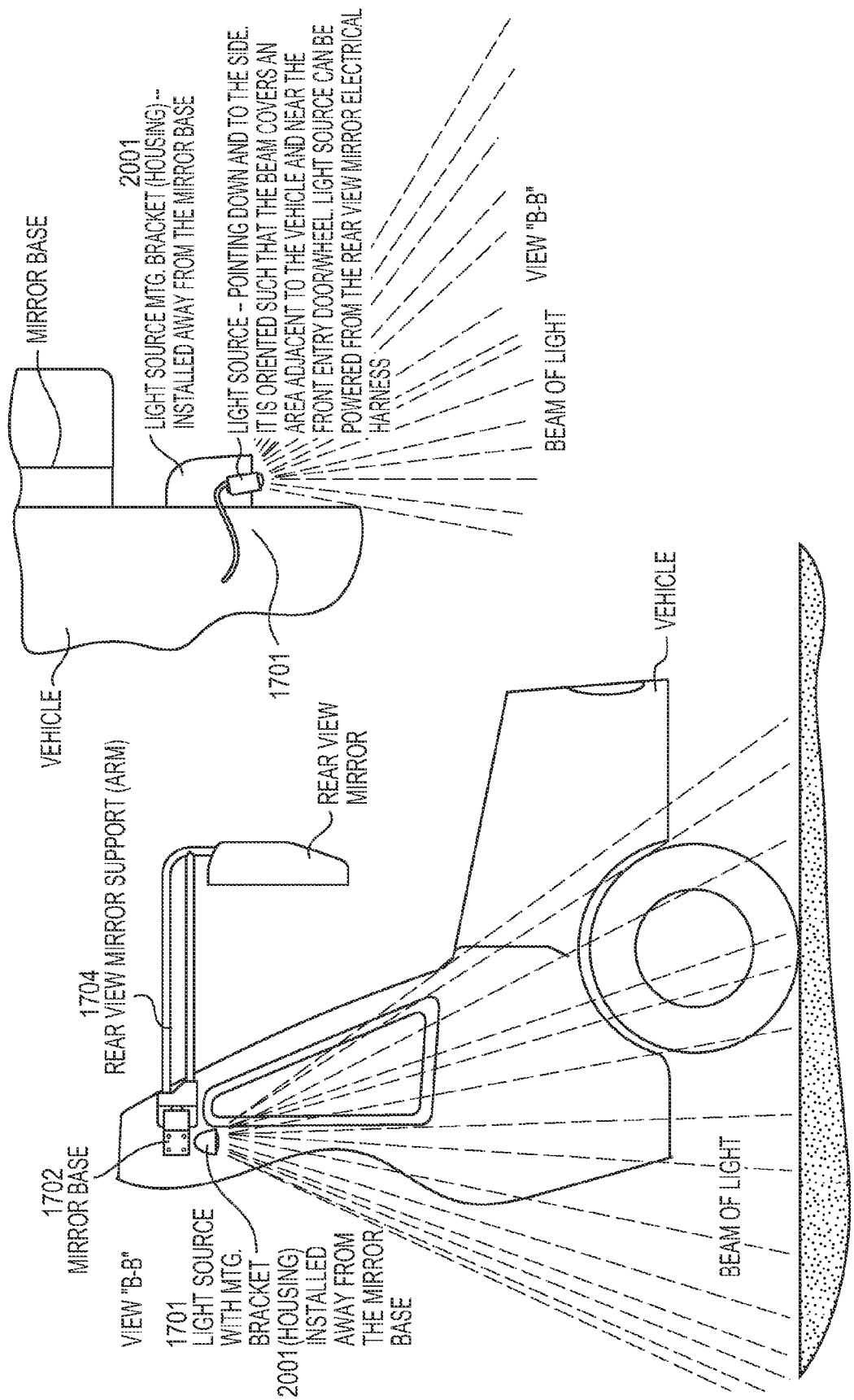
FIG. 20 is a side view line drawing illustrating a mirror assembly with a light source attached to a bus according to a further aspect of the invention.

FIG. 20 is a side view line drawing illustrating a mirror assembly with a light source attached to a bus according to a further aspect of the invention. Unlike FIGS. 17-19, the light source 1701 is not attached to the mirror base mount 1702, the mirror support arm 1704, and/or the rear view mirror housing 1705. Instead, the light source housing 2001 and light source 1701 are mounted directly to the vehicle. The light source housing 2001 and the light source 1701 may be mounted in close proximity to where the mirror arms are attached to the frame of the schools bus. In this embodiment it is advantageous to use the same mounting pillar, such as the standard B pillar, and other modifications to the school bus that are used for mounting the mirror base 1702 and mirror arm 1704. Alternatively, the light source housing 2001 and light source 1701 are mounted directly to the side of the vehicle, optionally using a standard vehicle pillar. This could include any number of conventional techniques such as sheet metal screws, fasteners, or adhesive materials such a glue or 3M Very High Bond tape.

Figure 21:
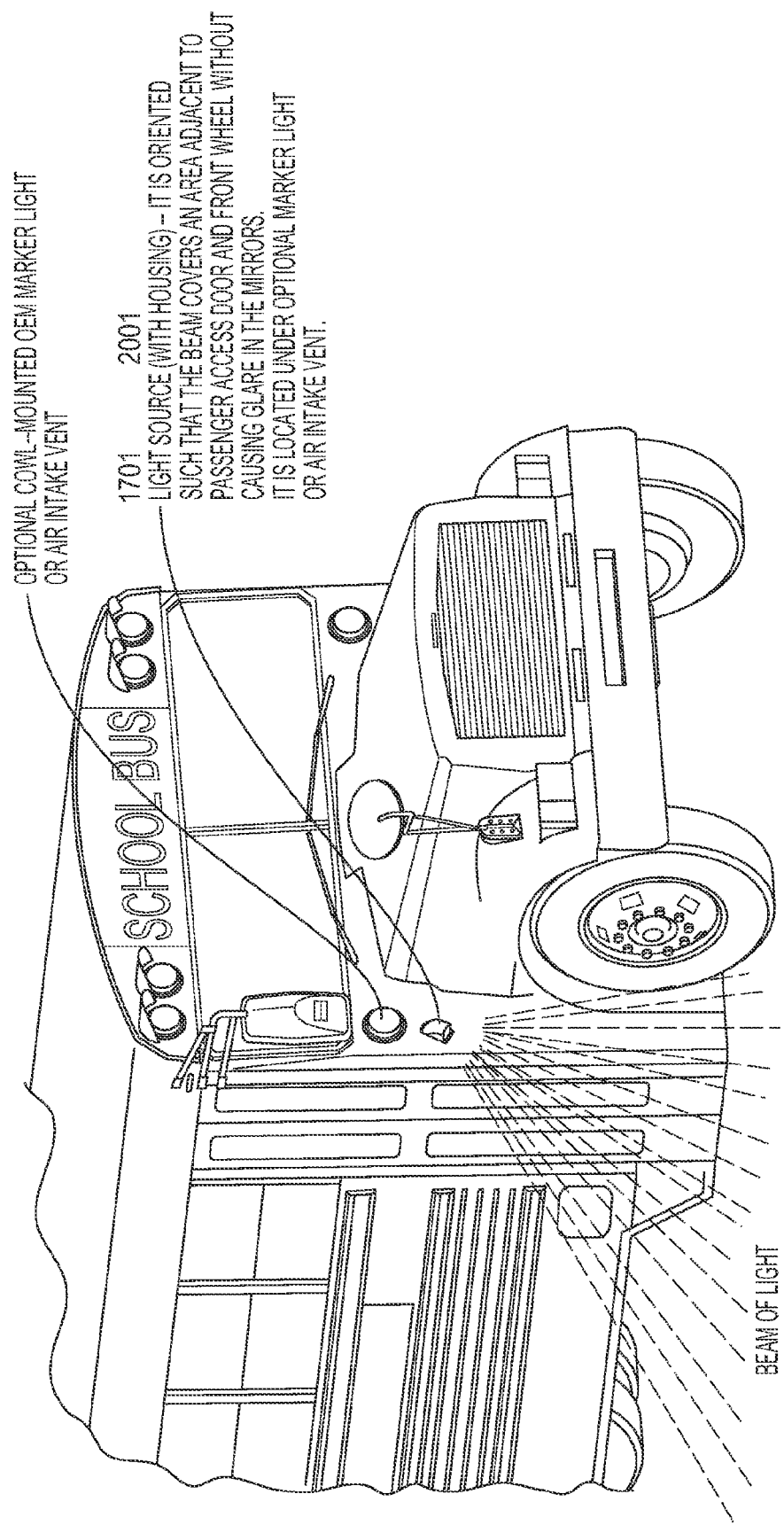
FIG. 21 is a perspective view line drawing illustrating a mirror assembly with a light source attached to a bus according to a further aspect of the invention.

FIG. 21 is a perspective view line drawing illustrating a mirror assembly with a light source attached to a bus according to a further aspect of the invention. Like FIG. 20, the light source housing 2001 and light source 1701 are mounted directly to the vehicle. Unlike FIG. 20, the light source housing 2001 and the light source 1701 are not mounted in close proximity to where the mirror arms are attached to the frame of the schools bus. In this embodiment it is advantageous to use the same mounting pillar, but in a different location. Alternatively, the light source housing 2001 and light source 1701 are mounted directly to the side of the vehicle. This could include any number of conventional techniques such as sheet metal screws, fasteners, or adhesive materials such a glue or 3M Very High Bond tape. The light source 1701 can be more advantageously placed and direct light to additional areas when the light source 1701 does not have to be mounted near a mirror mount. For example, as shown in FIG. 21, a light source 1701 is directed to an area adjacent to the passenger door. Unlike, FIGS. 17-19, the light source is advantageously mounted below the level of the mirrors. This reduces perceived glare in the mirrors. Also, as the light source is closer to the ground, a wider area can be illuminated for the same sized light source. In addition, the light source shown in FIG. 21 can be directed to include coverage of the front wheel and wheel well area.

Like the light sources described in FIGS. 17-19, one or more of the light sources 1701 shown in FIGS. 20 and 21 may automatically sweep the area on a frequent basis, or may be directed at the discretion of the school bus driver. Alternatively, one of the light sources may sweep the area back and forth or may be controlled and directed by the school bus driver with the other light sources remaining fixed. It will be understood that the light sources 1701 shown in FIGS. 20 and 21 may be provided at one or more doors located at any side of the school bus 10 and may be controlled to turn on and off in a manner similar to the lighting strip embodiment discussed above. Further, a combination of floodlights 25a-25c, lighting strips 20-22, and light sources 1701 may be used on the same school bus 10 mounted at different places on the school bus 10. Thus, for example, floodlight 25b may be provided as a source of illumination steerable or directable by the school bus driver, lighting strips 20-22 provided along the side or on the bottom of the school bus 10, and light sources 1701 provided near a door on the school bus 10.

The light source 1701 may be activated or deactivated automatically when movement is detected near the school bus 10. For example, LADAR (laser radar), infrared laser, or other detection systems may detect the presence or the movement of children or other passersby in an area near, adjacent or under the school bus 10, and the lighting system, or a relevant portion thereof, may thereby be automatically be triggered via processor 190. In addition, or in the alternative, a light meter or other sensor for detecting an amount of light or visibility condition may be provided at the school bus to trigger the lighting system when the visibility falls below a minimum acceptable range.

Although the present disclosure has been described in relation to particular embodiments thereof, many other variations, modifications, combination of features, and other uses will become apparent to those skilled in the art. It is preferred, therefore, that the present disclosure be limited not by the specific disclosure herein, but only by the appended claims.

What is claimed is:

1. A vehicle area illumination system for a bus or truck vehicle including an electrical mirror and mirror housing assembly, the vehicle area illumination system comprising:
a mirror mount securing the electrical vehicle mirror and mirror housing assembly to the vehicle and having a mirror electrical harness therethrough;
a light structure coupled to said mirror electrical harness and supported by said mirror mount, which directs light primarily at ground level and along an area located adjacent a door of the vehicle, in a manner which enables a driver to view a passenger located in the area via an exteriorly mounted bus mirror or camera, under conditions of lower visibility, wherein the light structure is powered by an electrical path running through the mirror mount;
at least one triggering device detecting an occurrence of an event including at least one of closing or opening a passenger door of the vehicle, issuance of a manual command to turn on or off the light structure, and a shifting of the vehicle's transmission into a park or drive mode, and said triggering device transmitting a signal responsive thereto;
a processor controlling the light structure in response to the signal received from said triggering device determining the occurrence of the event including the at least one of closing or opening a passenger door of the vehicle, issuance of a manual command to turn on or off the light structure, and a shifting of the vehicle's transmission into a park or drive mode, and said processor controls turning off the light structure after a lapse of a set or user-adjustable time period after the occurrence of the event.

2. The vehicle area illumination system of claim 1, wherein said mirror mount comprises a mount and a support arm connected to said mount, and wherein the light structure is positioned on the mount or on the arm of the mirror mount, the arm of the mirror mount extending away from at least one of a passenger side exterior wall and a driver side exterior wall.

3. The vehicle area illumination system of claim 1, wherein the light structure is positioned above windows of the vehicle, in an orientation where the light from the light structure is directed toward the ground.

4. The vehicle area illumination system of claim 1, wherein the light structure is positioned above windows of the vehicle, in an orientation where the light from the light structure is directed down and to the side of the vehicle.

5. The vehicle area illumination system of claim 1, wherein the light structure includes components that are located both at a passenger side wall and a driver's side walls—wall of the vehicle.

6. The vehicle area illumination system of claim 1, wherein the light structure includes components that are located both at a passenger side wall and a rear side walls—wall of the vehicle.

7. The vehicle area illumination system of claim 1, wherein the light structure includes components that are located both at a driver's side wall and a rear side walls of the vehicle.

8. The vehicle area illumination system of claim 1, further including an interface which receives an input signal from one or more of a transmission, manual switches, and a passenger door control.

9. The vehicle area illumination system of claim 1, including an interface which receives an input signal from a sensor and which controls the light structure in response to an output from the sensor.

10. The vehicle area illumination system of claim 9, wherein the sensor is one of an infrared sensor, a LADAR sensor and a motion sensor.

11. The vehicle area illumination system of claim 1, further comprising at least one of:
a light sensor mounted on the mirror housing assembly for controlling the reflectivity of the electrical vehicle mirror based on ambient lighting; and
a motion sensor mounted on the mirror housing assembly for controlling the reflectivity of the electrical vehicle mirror based on motion of the vehicle.

12. The vehicle area illumination system of claim 1, wherein the mirror mount is configured to cover the light structure such that the light structure is not visible by the vehicle driver.

13. A vehicle area illumination system for a bus or truck vehicle including an electrical mirror and mirror housing assembly, the vehicle area illumination system comprising:
a mirror mount securing the electrical vehicle mirror and mirror housing assembly to the vehicle and having a mirror electrical harness therethrough;
a light structure supported by said mirror mount, which directs light primarily at ground level and along an area located adjacent a door of the vehicle, in a manner which enables a driver to view a passenger located in the area via an exteriorly mounted bus mirror or camera, under conditions of lower visibility, wherein the light structure is powered by an electrical path running through the mirror mount;
a light meter that detects an amount of ambient light and transmits a signal in response to said detection;
an interface which receives the signal from said light meter; that detects an amount of ambient light and triggers the light structure when visibility falls below a minimum acceptable range in response to the occurrence of the event;
a processor in operative communication with said interface and said light structure, said processor controlling activation of said light structure in response the signal received from said interface and an occurrence of an event including at least one of closing or opening a passenger door of the vehicle, issuance of a manual command to turn on or off the light structure, and a shifting of the vehicle's transmission into a park or drive mode, and said processor controls turning off the light structure after a lapse of a set or user-adjustable time period after the occurrence of the event.

14. The vehicle area illumination system of claim 13, wherein said mirror mount comprises a mount and a support arm connected to said mount, and wherein the light structure is positioned on the mount or on the arm of the mirror mount, the arm of the mirror mount extending away from at least one of a passenger side exterior wall and a driver side exterior wall.

15. The vehicle illumination system of claim 13, wherein the light structure, further comprises
a light source; and
a light source mounting bracket connected to said light source and connected to said mirror mount.

16. The vehicle illumination system of claim 15, wherein the light source mounting bracket is attached to the mirror mount using at least one of the same mounting connection.

17. The vehicle illumination system of claim 15, wherein the light source mounting bracket is attached to the mirror mount using at least one of the same attachment device to attach the mirror mount to the vehicle.

18. The vehicle illumination system of claim 17, wherein the attachment device comprises a plurality of screws.

19. The vehicle area illumination system of claim 13, wherein said processor receives an input signal from one or more of a transmission, manual switches, and a passenger door control.

20. The vehicle area illumination system of claim 13, wherein said processor receives an input signal from at least one of an infrared sensor, a LADAR sensor, and a motion sensor, and controls the light structure in response to an output from said at least one of an infrared sensor, a LADAR sensor, and a motion sensor.

21. A vehicle area illumination system for a bus or truck vehicle including an electrical mirror and mirror housing assembly, the vehicle area illumination system comprising:
a mirror mount securing the electrical vehicle mirror and mirror housing assembly to the vehicle and having a mirror electrical harness therethrough;
a light structure supported by said mirror mount, which directs light primarily at ground level and along an area located adjacent a door of the vehicle, in a manner which enables a driver to view a passenger located in the area via an exteriorly mounted bus mirror or camera, under conditions of lower visibility, wherein the light structure is powered by an electrical path running through the mirror mount;
a light meter that detects an amount of ambient light and transmits a signal in response to said detection;
an interface which receives the signal from said light meter; that detects an amount of ambient light and triggers the light structure when visibility falls below a minimum acceptable range in response to the occurrence of the event;

a processor in operative communication with said interface and said light structure, said processor controlling activation of said light structure in response to the signal received from said interface and an occurrence of an event including shifting of the vehicle's transmission into a park or drive mode, and said processor controls turning off the light structure after a lapse of a set or user-adjustable time period after the occurrence of the event.

* * * * *